United States Patent
Zhang

(10) Patent No.: US 11,736,978 B2
(45) Date of Patent: *Aug. 22, 2023

(54) METHOD AND APPARATUS FOR RECEIVING CPRI DATA STREAM, METHOD AND APPARATUS FOR RECEIVING ETHERNET FRAME, AND SYSTEM

(71) Applicant: Huawei Technologies Co., Ltd., Shenzhen (CN)

(72) Inventor: Fan Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,247

(22) Filed: Aug. 1, 2022

(65) Prior Publication Data

US 2022/0377609 A1 Nov. 24, 2022

Related U.S. Application Data

(63) Continuation of application No. 16/824,185, filed on Mar. 19, 2020, now Pat. No. 11,432,193, which is a
(Continued)

(51) Int. Cl.
*H04L 12/28* (2006.01)
*H04W 28/06* (2009.01)
(Continued)

(52) U.S. Cl.
CPC ......... *H04W 28/065* (2013.01); *H04W 88/08* (2013.01); *H04L 49/351* (2013.01);
(Continued)

(58) Field of Classification Search
CPC ......... H04B 7/26; H04B 10/25; H04B 10/27; H04J 3/06; H04J 3/0632; H04J 3/0667;
(Continued)

(56) References Cited

U.S. PATENT DOCUMENTS 7,646,751 B2   1/2010   Osterling et al.
8,514,800 B2   8/2013   Kim et al.
(Continued)

FOREIGN PATENT DOCUMENTS

CN   1845621 A    10/2006
CN   101248689 A   8/2008
(Continued)

OTHER PUBLICATIONS

CPRI Specification, Common Public Radio Interface (CPRI); Interface Specification, V6.0, Aug. 2013, 128 pages.
(Continued)

*Primary Examiner* — Frank Duong
(74) *Attorney, Agent, or Firm* — Conley Rose, P.C.

(57) ABSTRACT

A method and an apparatus for receiving a common public radio interface (CPRI) data stream, a method and an apparatus for receiving an Ethernet frame, and a system, where a first network apparatus receives a first CPRI data stream using a CPRI of the first network apparatus, where the first network apparatus generates a segment of the first CPRI data stream according to the first CPRI data stream, the first network apparatus generates an Ethernet frame, where the Ethernet frame includes the segment of the first CPRI data stream and a CPRI data identifier, and the CPRI data identifier indicates that the Ethernet frame carries CPRI data, and the first network apparatus sends the Ethernet frame to a second network apparatus using an Ethernet interface of the first network apparatus.

20 Claims, 10 Drawing Sheets

Related U.S. Application Data continuation of application No. 15/906,181, filed on Feb. 27, 2018, now Pat. No. 10,616,800, which is a continuation of application No. PCT/CN2015/088553, filed on Aug. 31, 2015.

(51) Int. Cl.
*H04W 88/08* (2009.01)
*H04L 49/351* (2022.01)
*H04W 80/02* (2009.01)
*H04W 92/16* (2009.01)

(52) U.S. Cl.
CPC ......... *H04L 2212/00* (2013.01); *H04W 80/02* (2013.01); *H04W 88/085* (2013.01); *H04W 92/16* (2013.01)

(58) Field of Classification Search
CPC . H04L 12/1886; H04L 12/44; H04L 12/4633; H04L 12/70; H04L 29/06; H04L 29/06068; H04L 29/06095; H04L 29/0653; H04L 49/351; H04L 49/555; H04L 69/08; H04L 69/22; H04L 69/323; H04L 2012/5652; H04W 4/06; H04W 28/06; H04W 28/065; H04W 80/02; H04W 88/08; H04W 88/085; H04W 92/16
See application file for complete search history.

(56) References Cited

U.S. PATENT DOCUMENTS

| | | |
|---|---|---|
| 8,599,827 B2 | 12/2013 | Irvine |
| 8,842,649 B2 | 9/2014 | Liu et al. |
| 8,929,295 B2 | 1/2015 | Take |
| 9,749,050 B2 | 8/2017 | Lamb et al. |
| 9,838,217 B2 | 12/2017 | Martinotti et al. |
| 10,863,386 B1* | 12/2020 | Anand ................ H04J 3/0647 |
| 2009/0180423 A1 | 7/2009 | Kroener |
| 2012/0057572 A1* | 3/2012 | Evans ................... H04J 3/02 370/338 |
| 2012/0113972 A1 | 5/2012 | Liu et al. |
| 2013/0051329 A1 | 2/2013 | Take |
| 2013/0100948 A1 | 4/2013 | Irvine |
| 2015/0236785 A1 | 8/2015 | Lamb et al. |
| 2015/0249549 A1* | 9/2015 | Martinotti .......... H04L 12/4633 370/242 |
| 2016/0277964 A1 | 9/2016 | Xu et al. |

FOREIGN PATENT DOCUMENTS

| | | |
|---|---|---|
| CN | 101931454 A | 12/2010 |
| CN | 102118191 A | 7/2011 |
| CN | 102186265 A | 9/2011 |
| CN | 102497233 A | 6/2012 |
| CN | 103888181 A | 6/2014 |
| CN | 103999541 A | 8/2014 |
| CN | 104852766 A | 8/2015 |
| EP | 1827036 B1 | 4/2010 |
| EP | 2908600 A1 | 8/2015 |
| WO | 2007006629 A1 | 1/2007 |
| WO | 2010145187 A1 | 12/2010 |
| WO | 2013189553 A1 | 12/2013 |
| WO | 2015087307 A1 | 6/2015 |

OTHER PUBLICATIONS

Chen, D., et al., "Ethernet Fronthaul Considerations," Nokia, Feb. 2, 2015, 12 pages.

Xue-Yi, L., "The EDA design of CPRI interface specification in digital optic-fiber repeater and RRU," Faculty Information Engineering, Guangdong University of Technology, Aug. 10, 2009, 4 pages.

* cited by examiner

METHOD AND APPARATUS FOR RECEIVING CPRI DATA STREAM, METHOD AND APPARATUS FOR RECEIVING ETHERNET FRAME, AND SYSTEM

CROSS-REFERENCE TO RELATED APPLICATION

This is a continuation of U.S. patent application Ser. No. 16/824,185 filed on Mar. 19, 2020, which is a continuation of U.S. patent application Ser. No. 15/906,181 filed on Feb. 27, 2018, now U.S. Pat. No. 10,616,800, which is a continuation of International Patent Application No. PCT/CN2015/088553 filed on Aug. 31, 2015. All of the aforementioned applications are hereby incorporated by reference in their entireties.

TECHNICAL FIELD

The present disclosure relates to the field of communications technologies, and in particular, to a method and an apparatus for receiving a common public radio interface (CPRI) data stream, a method and an apparatus for receiving an Ethernet frame, and a system.

BACKGROUND

In a radio access network (RAN), a remote radio unit (RRU) interacts with a baseband unit (BBU) using a CPRI. In the other approaches, an RRU and a BBU are generally connected in a point to point manner using a fiber. As shown in FIG. 1, an RRU transmits a CPRI data stream to a BBU using a fiber between the RRU and the BBU.

In other approaches, CPRI data cannot be transmitted using the Ethernet. Therefore, a CPRI data transmission manner is not flexible enough.

SUMMARY

To resolve a problem that a CPRI data transmission manner is not flexible enough, embodiments of the present disclosure provide a method and an apparatus for receiving a CPRI data stream, a method and an apparatus for receiving an Ethernet frame, and a system.

A first aspect provides a method for receiving a CPRI data stream, where the method includes receiving, by a first network apparatus, a first CPRI data stream using a CPRI of the first network apparatus, generating, by the first network apparatus, a segment of the first CPRI data stream according to the first CPRI data stream, generating, by the first network apparatus, an Ethernet frame, where the Ethernet frame includes the segment of the first CPRI data stream and a CPRI data identifier, and the CPRI data identifier is used to indicate that the Ethernet frame carries CPRI data, and sending, by the first network apparatus, the Ethernet frame to a second network apparatus using an Ethernet interface of the first network apparatus.

In a first possible implementation manner of the first aspect, the method further includes determining, by the first network apparatus, a first value according to a frequency of a clock device of a first apparatus and a frequency of a clock device of the first network apparatus, where the first CPRI data stream is sent by the first apparatus, and the Ethernet frame further includes the first value.

With reference to the first aspect or the first possible implementation manner of the first aspect, in a second possible implementation manner of the first aspect, the Ethernet frame further includes a first time, where the first time is a time at which the first network apparatus generates the segment of the first CPRI data stream.

With reference to any one of the first aspect to the second possible implementation manner of the first aspect, in a third possible implementation manner of the first aspect, the second network apparatus is connected to a second apparatus using a CPRI of the second network apparatus, and when the first apparatus is an RRU, the second apparatus is a BBU, or when the first apparatus is a BBU, the second apparatus is an RRU.

With reference to the third possible implementation manner of the first aspect, in a fourth possible implementation manner of the first aspect, the method further includes receiving, by the first network apparatus using a CPRI of the first network apparatus, a second CPRI data stream sent by a third apparatus, and generating, by the first network apparatus, a segment of the second CPRI data stream according to the second CPRI data stream, where the Ethernet frame further includes the CPRI data identifier, the segment of the first CPRI data stream, and the segment of the second CPRI data stream, and when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

With reference to the fourth possible implementation manner of the first aspect, in a fifth possible implementation manner of the first aspect, the method further includes determining, by the first network apparatus, a second value according to a frequency of a clock device of the third apparatus and the frequency of the clock device of the first network apparatus, where the Ethernet frame further includes the second value.

With reference to the fourth possible implementation manner of the first aspect or the fifth possible implementation manner of the first aspect, in a sixth possible implementation manner of the first aspect, the Ethernet frame further includes a second time, where the second time is a time at which the first network apparatus generates the segment of the second CPRI data stream.

With reference to the sixth possible implementation manner of the first aspect, in a seventh possible implementation manner of the first aspect, generating, by the first network apparatus, an Ethernet frame includes generating, by the first network apparatus, a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and generating, by the first network apparatus, a first Ethernet frame and a second Ethernet frame, where the first Ethernet frame includes the first CPRI data segment, the second Ethernet frame includes the second CPRI data segment, and the Ethernet frame includes the first Ethernet frame and the second Ethernet frame, or generating, by the first network apparatus, an Ethernet frame includes generating, by the first network apparatus, a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and generating, by the first network apparatus, the Ethernet frame, where the Ethernet frame includes the first CPRI data segment and the second CPRI data segment.

A second aspect provides a method for receiving an Ethernet frame, where the method includes receiving, by a second network apparatus, an Ethernet frame from a first network apparatus using an Ethernet interface of the second network apparatus, where the Ethernet frame includes a CPRI data identifier, determining, by the second network apparatus according to the CPRI data identifier, that the Ethernet frame carries a segment of a CPRI data stream, obtaining, by the second network apparatus, a segment of a first CPRI data stream from the Ethernet frame after the second network apparatus determines that the Ethernet frame carries the segment of the CPRI data stream, and sending, by the second network apparatus, the segment of the first CPRI data stream using a CPRI of the second network apparatus.

In a first possible implementation manner of the second aspect, the first CPRI data stream is received by the first network apparatus using a CPRI of the first network apparatus, and the first CPRI data stream is from a first apparatus, and sending, by the second network apparatus, the segment of the first CPRI data stream using a CPRI of the second network apparatus includes sending, by the second network apparatus, the segment of the first CPRI data stream to a second apparatus using the CPRI of the second network apparatus, where when the first apparatus is an RRU, the second apparatus is a BBU, or when the first apparatus is a BBU, the second apparatus is an RRU.

With reference to the first possible implementation manner of the second aspect, in a second possible implementation manner of the second aspect, the method further includes obtaining, by the second network apparatus, a first value from the Ethernet frame, where the first value is obtained by the first network apparatus according to a frequency of a clock device of the first apparatus and a frequency of a clock device of the first network apparatus, and determining, by the second network apparatus, the frequency of the clock device of the first apparatus according to the first value and a frequency of a clock device of the second network apparatus, where the frequency of the clock device of the first network apparatus is equal to the frequency of the clock device of the second network apparatus, and sending, by the second network apparatus, the segment of the first CPRI data stream using a CPRI of the second network apparatus includes sending, by the second network apparatus, the segment of the first CPRI data stream to the second apparatus using the CPRI of the second network apparatus, where a rate at which the second network apparatus sends the segment of the first CPRI data stream is equal to a product of the frequency of the clock device of the first apparatus and a bit width of the CPRI of the second network apparatus.

With reference to the second possible implementation manner of the second aspect, in a third possible implementation manner of the second aspect, the method further includes obtaining, by the second network apparatus, a first time from the Ethernet frame, where the first time is a time at which the first network apparatus generates the segment of the first CPRI data stream, determining, by the second network apparatus, a first latency according to the first time and a third time, where the third time is a time at which the second network apparatus obtains the segment of the first CPRI data stream, and determining, by the second network apparatus, a fifth time according to the first latency, and sending, by the second network apparatus, the segment of the first CPRI data stream using a CPRI of the second network apparatus includes sending, by the second network apparatus, the segment of the first CPRI data stream to the second apparatus at the fifth time using the CPRI of the second network apparatus.

With reference to any one of the first possible implementation manner of the second aspect to the third possible implementation manner of the second aspect, in a fourth possible implementation manner of the second aspect, the method further includes obtaining, by the second network apparatus, a segment of a second CPRI data stream from the Ethernet frame, where the second CPRI data stream is received by the first network apparatus using a CPRI of the first network apparatus, and the second CPRI data stream is from a third apparatus, and sending, by the second network apparatus, the segment of the second CPRI data stream to the second apparatus using a CPRI of the second network apparatus, where when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

With reference to the fourth possible implementation manner of the second aspect, in a fifth possible implementation manner of the second aspect, the method further includes obtaining, by the second network apparatus, a second value from the Ethernet frame, where the second value is obtained by the first network apparatus according to a frequency of a clock device of the third apparatus and the frequency of the clock device of the first network apparatus, and determining, by the second network apparatus, the frequency of the clock device of the third apparatus according to the second value and the frequency of the clock device of the second network apparatus, where the frequency of the clock device of the first network apparatus is equal to the frequency of the clock device of the second network apparatus, and sending, by the second network apparatus, the segment of the second CPRI data stream to the second apparatus using a CPRI of the second network apparatus includes sending, by the second network apparatus, the segment of the second CPRI data stream to the second apparatus using the CPRI of the second network apparatus, where a rate at which the second network apparatus sends the segment of the second CPRI data stream is equal to a product of the frequency of the clock device of the third apparatus and a bit width of the CPRI of the second network apparatus.

With reference to the fourth possible implementation manner of the second aspect or the fifth possible implementation manner of the second aspect, in a sixth possible implementation manner of the second aspect, the method further includes obtaining, by the second network apparatus, a second time from the Ethernet frame, where the second time is a time at which the first network apparatus generates the segment of the second CPRI data stream, determining, by the second network apparatus, a second latency according to the second time and a fourth time, where the fourth time is a time at which the second network apparatus obtains the segment of the second CPRI data stream, and determining, by the second network apparatus, a sixth time according to the second latency, and sending, by the second network apparatus, the segment of the second CPRI data stream to the second apparatus using a CPRI of the second network apparatus includes sending, by the second network apparatus, the segment of the second CPRI data stream to the second apparatus at the sixth time using the CPRI of the second network apparatus.

With reference to the sixth possible implementation manner of the second aspect, in a seventh possible implementation manner of the second aspect, obtaining, by the second network apparatus, a segment of a first CPRI data stream and a segment of a second CPRI data stream according to the Ethernet frame includes obtaining, by the second network apparatus, a first CPRI data segment and a second CPRI data segment from the Ethernet frame, where the Ethernet frame includes a first Ethernet frame, the first Ethernet frame includes the first CPRI data segment, the Ethernet frame includes a second Ethernet frame, and the second Ethernet frame includes the second CPRI data segment, and obtaining, by the second network apparatus, the segment of the first CPRI data stream and a first CPRI header from the first CPRI data segment, and obtaining the segment of the second CPRI data stream and a second CPRI header from the second CPRI data segment, where the first CPRI header includes the first value and the first time, and the second CPRI header includes the second value and the second time, or obtaining, by the second network apparatus, a segment of a first CPRI data stream and a segment of a second CPRI data stream according to the Ethernet frame includes obtaining, by the second network apparatus, a first CPRI data segment and a second CPRI data segment from the Ethernet frame, and obtaining, by the second network apparatus, the segment of the first CPRI data stream and a first CPRI header from the first CPRI data segment, and obtaining the segment of the second CPRI data stream and a second CPRI header from the second CPRI data segment, where the first CPRI header includes the first value and the first time, and the second CPRI header includes the second value and the second time.

A third aspect provides a first network apparatus for receiving a CPRI data stream, where the first network apparatus includes a first receiving unit configured to receive a first CPRI data stream using a CPRI of the first network apparatus, a first generating unit configured to generate a segment of the first CPRI data stream according to the first CPRI data stream received by the first receiving unit, a second generating unit configured to generate an Ethernet frame, where the Ethernet frame includes the segment of the first CPRI data stream generated by the first generating unit and a CPRI data identifier, and the CPRI data identifier is used to indicate that the Ethernet frame carries CPRI data, and a sending unit configured to send the Ethernet frame generated by the second generating unit to a second network apparatus using an Ethernet interface of the first network apparatus.

In a first possible implementation manner of the third aspect, the first network apparatus further includes a first determining unit configured to determine a first value according to a frequency of a clock device of a first apparatus and a frequency of a clock device of the first network apparatus, where the first CPRI data stream is sent by the first apparatus, and the Ethernet frame further includes the first value.

With reference to the third aspect or the first possible implementation manner of the third aspect, in a second possible implementation manner of the third aspect, the Ethernet frame further includes a first time, where the first time is a time at which the first network apparatus generates the segment of the first CPRI data stream.

With reference to any one of the third aspect to the second possible implementation manner of the third aspect, in a third possible implementation manner of the third aspect, the second network apparatus is connected to a second apparatus using a CPRI of the second network apparatus, and when the first apparatus is an RRU, the second apparatus is a BBU, or when the first apparatus is a BBU, the second apparatus is an RRU.

With reference to the third possible implementation manner of the third aspect, in a fourth possible implementation manner of the third aspect, the first network apparatus further includes a second receiving unit configured to receive, using a CPRI of the first network apparatus, a second CPRI data stream sent by a third apparatus, and a third generating unit configured to generate a segment of the second CPRI data stream according to the second CPRI data stream received by the second receiving unit, where the Ethernet frame further includes the CPRI data identifier, the segment of the first CPRI data stream, and the segment of the second CPRI data stream, and when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

With reference to the fourth possible implementation manner of the third aspect, in a fifth possible implementation manner of the third aspect, the first network apparatus further includes a second determining unit configured to determine a second value according to a frequency of a clock device of the third apparatus and the frequency of the clock device of the first network apparatus, where the Ethernet frame further includes the second value.

With reference to the fourth possible implementation manner of the third aspect or the fifth possible implementation manner of the third aspect, in a sixth possible implementation manner of the third aspect, the Ethernet frame further includes a second time, where the second time is a time at which the first network apparatus generates the segment of the second CPRI data stream.

With reference to the sixth possible implementation manner of the third aspect, in a seventh possible implementation manner of the third aspect, the second generating unit includes a first generating subunit and a second generating subunit, where the first generating subunit is configured to generate a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and the second generating subunit is configured to generate a first Ethernet frame and a second Ethernet frame, where the first Ethernet frame includes the first CPRI data segment generated by the first generating subunit, the second Ethernet frame includes the second CPRI data segment generated by the first generating subunit, and the Ethernet frame includes the first Ethernet frame and the second Ethernet frame, or the second generating unit includes a third generating subunit and a fourth generating subunit, where the third generating subunit is configured to generate a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and the fourth generating subunit is configured to generate the Ethernet frame, where the Ethernet frame includes the first CPRI data segment generated by the third generating subunit and the second CPRI data segment generated by the third generating subunit.

A fourth aspect provides a second network apparatus for receiving an Ethernet frame, where the second network apparatus includes a receiving unit configured to receive an Ethernet frame from a first network apparatus using an Ethernet interface of the second network apparatus, where the Ethernet frame includes a CPRI data identifier, an identifying unit configured to determine, according to the CPRI data identifier, that the Ethernet frame received by the receiving unit carries a segment of a CPRI data stream, a first obtaining unit configured to obtain a segment of a first CPRI data stream from the Ethernet frame received by the receiving unit after the identifying unit determines that the received Ethernet frame carries the segment of the CPRI data stream, and a first sending unit configured to send, using a CPRI of the second network apparatus, the segment of the first CPRI data stream obtained by the first obtaining unit.

In a first possible implementation manner of the fourth aspect, the first CPRI data stream is received by the first network apparatus using a CPRI of the first network apparatus, and the first CPRI data stream is from a first apparatus, and the first sending unit is further configured to send the segment of the first CPRI data stream obtained by the first obtaining unit to a second apparatus using the CPRI of the second network apparatus, where when the first apparatus is an RRU, the second apparatus is a BBU, or when the first apparatus is a BBU, the second apparatus is an RRU.

With reference to the first possible implementation manner of the fourth aspect, in a second possible implementation manner of the fourth aspect, the second network apparatus further includes a second obtaining unit configured to obtain a first value from the Ethernet frame received by the receiving unit, where the first value is obtained by the first network apparatus according to a frequency of a clock device of the first apparatus and a frequency of a clock device of the first network apparatus, and a first determining unit configured to determine the frequency of the clock device of the first apparatus according to the first value obtained by the second obtaining unit and a frequency of a clock device of the second network apparatus, where the frequency of the clock device of the first network apparatus is equal to the frequency of the clock device of the second network apparatus, where the first sending unit is further configured to send the segment of the first CPRI data stream to the second apparatus using the CPRI of the second network apparatus, where a rate at which the second network apparatus sends the segment of the first CPRI data stream is equal to a product of the frequency, determined by the first determining unit, of the clock device of the first apparatus and a bit width of the CPRI of the second network apparatus.

With reference to the second possible implementation manner of the fourth aspect, in a third possible implementation manner of the fourth aspect, the second network apparatus further includes a third obtaining unit configured to obtain a first time from the Ethernet frame received by the receiving unit, where the first time is a time at which the first network apparatus generates the segment of the first CPRI data stream, a second determining unit configured to determine a first latency according to the first time obtained by the third obtaining unit and a third time, where the third time is a time at which the second network apparatus obtains the segment of the first CPRI data stream, and a third determining unit configured to determine a fifth time according to the first latency determined by the second determining unit, where the first sending unit is further configured to send, using the CPRI of the second network apparatus, the segment of the first CPRI data stream to the second apparatus at the fifth time determined by the third determining unit.

With reference to any one of the first possible implementation manner of the fourth aspect to the third possible implementation manner of the fourth aspect, in a fourth possible implementation manner of the fourth aspect, the first obtaining unit is further configured to obtain a segment of a second CPRI data stream from the Ethernet frame, where the second CPRI data stream is received by the first network apparatus using a CPRI of the first network apparatus, and the second CPRI data stream is from a third apparatus, and the second network apparatus further includes a second sending unit configured to send the segment of the second CPRI data stream obtained by the first obtaining unit to the second apparatus using a CPRI of the second network apparatus, where when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

With reference to the fourth possible implementation manner of the fourth aspect, in a fifth possible implementation manner of the fourth aspect, the second network apparatus further includes a fourth obtaining unit configured to obtain a second value from the Ethernet frame received by the receiving unit, where the second value is obtained by the first network apparatus according to a frequency of a clock device of the third apparatus and the frequency of the clock device of the first network apparatus, and a fourth determining unit configured to determine the frequency of the clock device of the third apparatus according to the second value obtained by the fourth obtaining unit and the frequency of the clock device of the second network apparatus, where the frequency of the clock device of the first network apparatus is equal to the frequency of the clock device of the second network apparatus, where the second sending unit is further configured to send the segment of the second CPRI data stream to the second apparatus using the CPRI of the second network apparatus, where a rate at which the second network apparatus sends the segment of the second CPRI data stream is equal to a product of the frequency, determined by the fourth determining unit, of the clock device of the third apparatus and a bit width of the CPRI of the second network apparatus.

With reference to the fourth possible implementation manner of the fourth aspect or the fifth possible implementation manner of the fourth aspect, in a sixth possible implementation manner of the fourth aspect, the second network apparatus further includes a fifth obtaining unit configured to obtain a second time from the Ethernet frame received by the receiving unit, where the second time is a time at which the first network apparatus generates the segment of the second CPRI data stream, a fifth determining unit configured to determine a second latency according to the second time obtained by the fifth obtaining unit and a fourth time, where the fourth time is a time at which the second network apparatus obtains the segment of the second CPRI data stream, and a sixth determining unit configured to determine a sixth time according to the second latency determined by the fifth determining unit, where the second sending unit is further configured to send, using the CPRI of the second network apparatus, the segment of the second CPRI data stream to the second apparatus at the sixth time determined by the sixth determining unit.

With reference to the sixth possible implementation manner of the fourth aspect, in a seventh possible implementation manner of the fourth aspect, the first obtaining unit includes a first obtaining subunit and a second obtaining subunit, where the first obtaining subunit is configured to obtain a first CPRI data segment and a second CPRI data segment from the Ethernet frame received by the receiving unit, where the Ethernet frame includes a first Ethernet frame, the first Ethernet frame includes the first CPRI data segment, the Ethernet frame includes a second Ethernet frame, and the second Ethernet frame includes the second CPRI data segment, and the second obtaining subunit is configured to obtain the segment of the first CPRI data stream and a first CPRI header from the first CPRI data segment obtained by the first obtaining subunit, and obtain the segment of the second CPRI data stream and a second CPRI header from the second CPRI data segment obtained by the first obtaining subunit, where the first CPRI header includes the first value and the first time, and the second CPRI header includes the second value and the second time, or the first obtaining unit includes a third obtaining subunit and a fourth obtaining subunit, where the third obtaining subunit is configured to obtain a first CPRI data segment and a second CPRI data segment from the Ethernet frame received by the receiving unit, and the fourth obtaining subunit is configured to obtain the segment of the first CPRI data stream and a first CPRI header from the first CPRI data segment obtained by the third obtaining subunit, and obtain the segment of the second CPRI data stream and a second CPRI header from the second CPRI data segment obtained by the third obtaining subunit, where the first CPRI header includes the first value and the first time, and the second CPRI header includes the second value and the second time.

A fifth aspect provides a system for transmitting a CPRI data stream, where the system includes the first network apparatus for receiving a CPRI data stream according to any one of the third aspect to the seventh possible implementation manner of the third aspect, and the second network apparatus for receiving an Ethernet frame according to any one of the fourth aspect to the seventh possible implementation manner of the fourth aspect, where the first network apparatus and the second network apparatus are connected using the Ethernet.

The foregoing technical solutions have the following beneficial effects.

A first network apparatus receives a first CPRI data stream using a CPRI of the first network apparatus, the first network apparatus generates a segment of the first CPRI data stream according to the first CPRI data stream, the first network apparatus generates an Ethernet frame, where the Ethernet frame includes the segment of the first CPRI data stream and a CPRI data identifier, and the CPRI data identifier is used to indicate that the Ethernet frame carries CPRI data, and the first network apparatus sends the Ethernet frame to a second network apparatus using an Ethernet interface of the first network apparatus. That is, the Ethernet frame generated by the first network apparatus includes the segment of the first CPRI data stream. In addition, the first network apparatus sends the Ethernet frame using the Ethernet interface. Therefore, the foregoing technical solutions provide a new CPRI data transmission manner, thereby implementing flexible CPRI data transmission.

BRIEF DESCRIPTION OF DRAWINGS

To describe the technical solutions in the embodiments of the present disclosure more clearly, the following briefly describes the accompanying drawings required for describing the embodiments. The accompanying drawings in the following description merely show some embodiments of the present disclosure, and persons of ordinary skill in the art can derive other drawings from these accompanying drawings without creative efforts.

DESCRIPTION OF EMBODIMENTS

Figure 1:
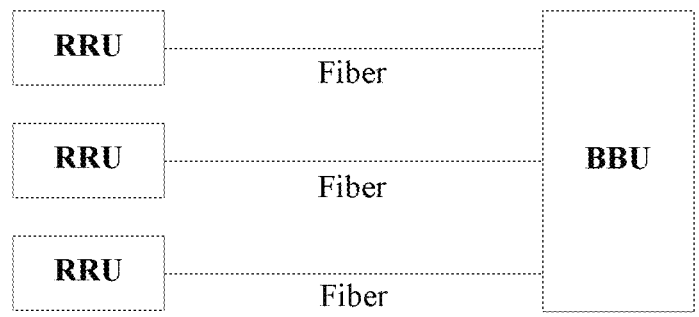
FIG. 1 is a schematic structural diagram in which an RRU is connected to a BBU using a fiber.

To provide an implementation solution of transmitting CPRI data using the Ethernet, embodiments provide a method and an apparatus for receiving a CPRI data stream, a method and an apparatus for receiving an Ethernet frame, and a system. The embodiments are described in the following in detail with reference to the accompanying drawings in this specification.

A CPRI in the embodiments may be a master port or a slave port. For the master port and the slave port, reference may be made to the CPRI Specification V6.1 published on Jul. 1, 2014. The CPRI Specification V6.1 may be obtained at www.cpri.info.

A BBU in the embodiments may be implemented using radio equipment control (REC). An RRU may be implemented using a radio equipment (RE). For the REC and the RE, refer to the CPRI Specification V6.1 published on Jul. 1, 2014.

A CPRI data frame in the embodiments refers to a frame defined in the CPRI Specification. For example, the CPRI data frame may be a basic frame or a hyperframe. For the basic frame and the hyperframe, refer to the CPRI Specification V6.1 published on Jul. 1, 2014.

A CPRI data stream in the embodiments refers to a set of CPRI data frames having a same feature. The CPRI data stream may be transmitted using a CPRI link. For the CPRI link, refer to the CPRI Specification V6.1 published on Jul. 1, 2014. A feature of a CPRI data frame may be a source of the CPRI data frame, a destination of the CPRI data frame, or a source and a destination of the CPRI data frame. For example, when a destination is used as a feature of a CPRI data frame, a CPRI data stream whose destination is an RRU1 and a CPRI data stream whose destination is an RRU2 are different CPRI data streams. For another example, when a source and a destination are used as a feature of a CPRI data frame, a CPRI data stream whose source is a BBU1 and whose destination is an RRU1 and a CPRI data stream whose source is a BBU2 and whose destination is an RRU2 are different CPRI data streams. A CPRI data stream whose source is a BBU1 and whose destination is an RRU1 and a CPRI data stream whose source is the BBU1 and whose destination is an RRU2 are also different CPRI data streams. In addition, a CPRI data stream may be generated by a BBU or may be generated by an RRU.

A segment of a CPRI data stream in the embodiments may be a CPRI data stream that is sent by a BBU or an RRU within a time period. The time period may start from t1 and end at t2. A length of the time period is not limited in the embodiments. The segment of the CPRI data stream may be one CPRI data frame, multiple CPRI data frames, or a segment of one CPRI data frame. The segment of the CPRI data stream may be segments of two adjacent CPRI data frames, for example, the latter half of a CPRI data frame that is transmitted early and the former half of a CPRI data frame that is transmitted later. Alternatively, the segment of the CPRI data stream may be data in another form. For example, a CPRI data stream includes a CPRI data frame 1, a CPRI data frame 2, and a CPRI data frame 3. The CPRI data frame 1 is adjacent to the CPRI data frame 2. The CPRI data frame 2 is adjacent to the CPRI data frame 3. The CPRI data frame 1 is transmitter earlier than the CPRI data frame 2. The CPRI data frame 2 is transmitter earlier than the CPRI data frame 3. The segment of the CPRI data stream may be the latter half of the CPRI data frame 1, the CPRI data frame 2, and the former half of the CPRI data frame 3.

Figure 2:
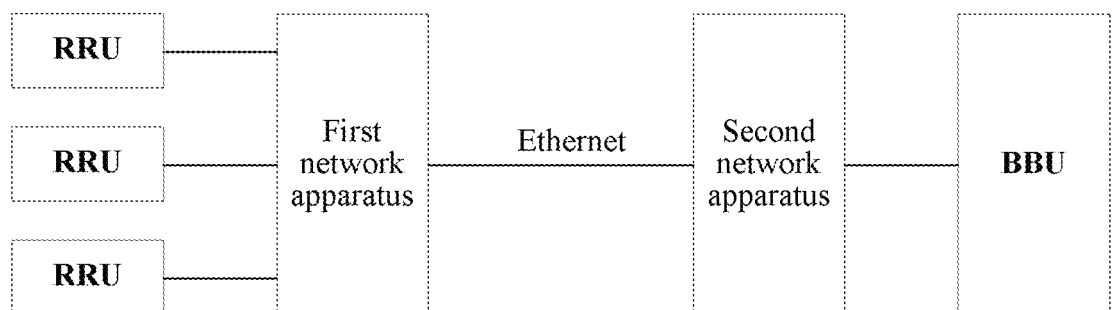
FIG. 2 is a schematic diagram of a system framework of an application scenario according to an embodiment of the present disclosure.

FIG. 2 is a schematic diagram of a system framework of an application scenario according to an embodiment of the present disclosure. An RRU is connected to a first network apparatus. A BBU is connected to a second network apparatus. The first network apparatus and the second network apparatus are connected using the Ethernet. The first network apparatus receives a CPRI data stream sent by the RRU. The first network apparatus generates a segment of the CPRI data stream according to the CPRI data stream. The first network apparatus generates an Ethernet frame, where the Ethernet frame includes the segment of the CPRI data stream. The first network apparatus sends the Ethernet frame to the second network apparatus using the Ethernet. The second network apparatus obtains the segment of the CPRI data stream according to the Ethernet frame. The second network apparatus sends the segment of the CPRI data stream to the BBU. According to the foregoing technical solution, CPRI data sent by the RRU to the BBU can be transmitted using the Ethernet. The CPRI data in this embodiment may be a segment of a CPRI data stream. The first network apparatus may be directly connected to the second network apparatus. Alternatively, the first network apparatus may be connected to the second network apparatus using at least one Ethernet apparatus. The at least one Ethernet apparatus may be an Ethernet switch.

Figure 3:
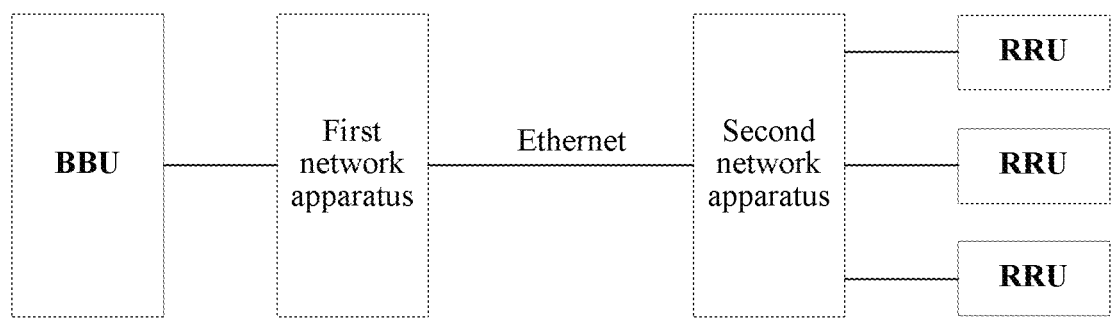
FIG. 3 is a schematic diagram of a system framework of another application scenario according to an embodiment of the present disclosure.

FIG. 3 is a schematic diagram of a system framework of another application scenario according to an embodiment of the present disclosure. A BBU is connected to a first network apparatus. An RRU is connected to a second network apparatus. The first network apparatus and the second network apparatus are connected using the Ethernet. The first network apparatus receives a CPRI data stream sent by the BBU. The first network apparatus generates a segment of the CPRI data stream according to the CPRI data stream. The first network apparatus generates an Ethernet frame, where the Ethernet frame includes the segment of the CPRI data stream. The first network apparatus sends the Ethernet frame to the second network apparatus using the Ethernet. The second network apparatus obtains the segment of the CPRI data stream according to the Ethernet frame. The second network apparatus sends the segment of the CPRI data stream to the RRU. According to the foregoing technical solution, CPRI data sent by the BBU to the RRU can be transmitted using the Ethernet. The CPRI data in this embodiment may be a segment of a CPRI data stream. The first network apparatus may be directly connected to the second network apparatus. Alternatively, the first network apparatus may be connected to the second network apparatus using at least one Ethernet apparatus. The at least one Ethernet apparatus may be an Ethernet switch.

During actual application, the application scenario shown in FIG. 2 and the application scenario shown in FIG. 3 may be further combined such that the CPRI data sent by the BBU to the RRU and the CPRI data sent by the RRU to the BBU are both transmitted using the Ethernet.

Compared with a conventional Ethernet apparatus, the first network apparatus shown in FIG. 2 includes a CPRI configured to receive a CPRI data stream. In addition, the first network apparatus has a capability of generating, according to a received CPRI data stream, an Ethernet frame including a segment of the CPRI data stream. Compared with the conventional Ethernet apparatus, the second network apparatus shown in FIG. 2 includes a CPRI configured to send a segment of a CPRI data stream. In addition, the second network apparatus has a capability of obtaining a segment of the CPRI data stream according to a received Ethernet frame including the segment of the CPRI data stream. Similarly, the first network apparatus shown in FIG. 3 includes a CPRI configured to receive a CPRI data stream. In addition, the first network apparatus has a capability of generating, according to a received CPRI data stream, an Ethernet frame including a segment of the CPRI data stream.

Compared with the conventional Ethernet apparatus, the second network apparatus shown in FIG. 3 also includes a CPRI configured to send a segment of a CPRI data stream. In addition, the second network apparatus has a capability of obtaining a segment of the CPRI data stream according to a received Ethernet frame including the segment of the CPRI data stream.

According to the foregoing technical solutions, CPRI data can be transmitted using the Ethernet. For example, a CPRI data stream sent by an RRU to a BBU is transmitted using the Ethernet. Alternatively, a CPRI data stream sent by a BBU to an RRU is transmitted using the Ethernet. The Ethernet is a widely applied network. Therefore, during specific implementation of the foregoing technical solutions, an existing Ethernet link resource can be fully used, thereby reducing CPRI data transmission costs. For example, compared with a solution in which a BBU and an RRU are directly connected using a fiber to transmit a CPRI data stream, the foregoing technical solutions can save a fiber resource. In addition, the foregoing technical solutions help improve Ethernet utilization, and implement integration of a Backhaul network and a Fronthaul network. The Fronthaul network may be a transmission network between multiple RRUs and a BBU (which may include a primary BBU and a secondary BBU). The Backhaul network may be a transmission network between a BBU located in a base station and a base station controller, and is used to bear data between the BBU of the base station and the controller.

Figure 4:
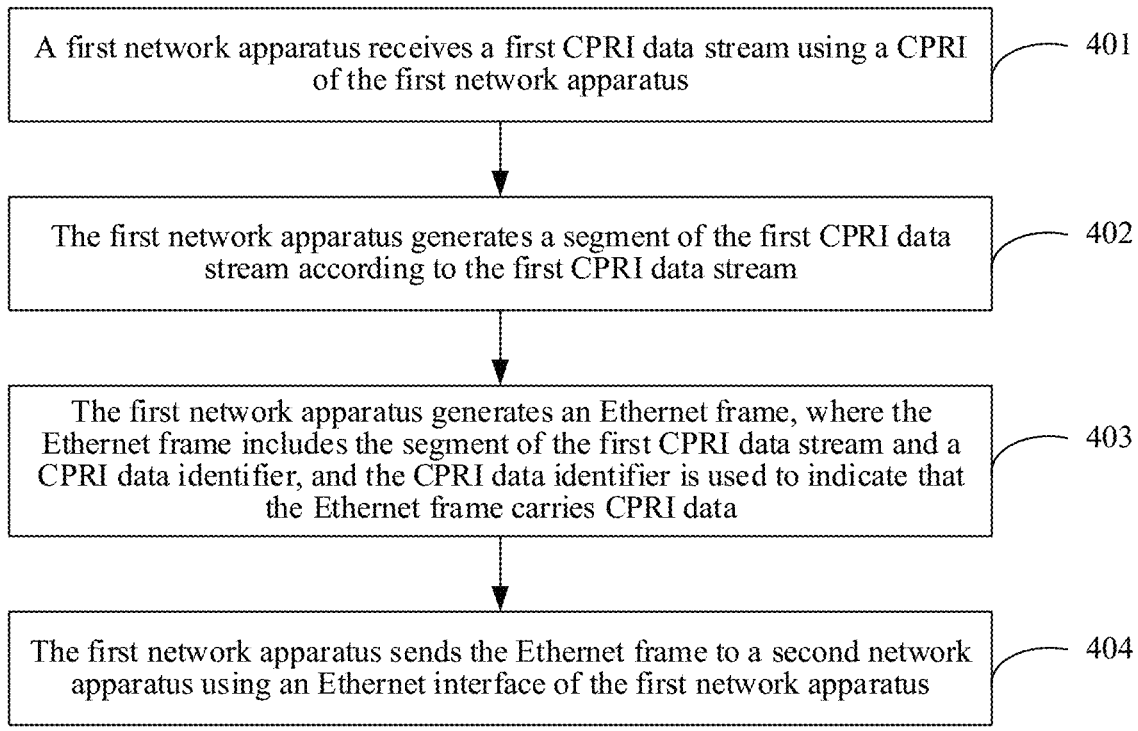
FIG. 4 is a flowchart of a method for receiving a CPRI data stream according to an embodiment of the present disclosure.

FIG. 4 is a schematic flowchart of a method for receiving a CPRI data stream according to an embodiment of the present disclosure. The method includes the following steps.

Step 401: A first network apparatus receives a first CPRI data stream using a CPRI of the first network apparatus.

Step 402: The first network apparatus generates a segment of the first CPRI data stream according to the first CPRI data stream.

Step 403: The first network apparatus generates an Ethernet frame, where the Ethernet frame includes the segment of the first CPRI data stream and a CPRI data identifier, and the CPRI data identifier is used to indicate that the Ethernet frame carries CPRI data.

The first network apparatus receives the first CPRI data stream sent by a first apparatus. Being driven by a clock device of the first apparatus, the first apparatus sends the first CPRI data stream using a CPRI of the first apparatus. A rate at which the first apparatus sends the first CPRI data stream is equal to a product of a frequency of the clock device of the first apparatus and a bit width of the CPRI of the first apparatus. The CPRI may be an electrical interface or an optical interface. The bit width of the CPRI may be a bit width of a data bus of the CPRI. For example, the CPRI may include a serializer/deserializer (serdes). The serdes includes a serial interface and a parallel interface. The bit width of the CPRI may be a bit width of the parallel interface of the serdes. The bit width of the CPRI of the first apparatus may be 8 bits, 16 bits, or 32 bits. During specific implementation, the first apparatus may be an RRU or may be a BBU.

The first network apparatus may generate one or more segments of the first CPRI data stream according to the first CPRI data stream. The segment of the first CPRI data stream may be a data segment of a preset length. The preset length is set according to a transmission rate in the Ethernet during actual application and the rate at which the first apparatus sends the first CPRI data stream to the first network apparatus.

The first network apparatus generates the Ethernet frame, where the Ethernet frame includes the CPRI data identifier. A receiving end of the Ethernet frame (for example, a second network apparatus) may identify, according to the CPRI data identifier, an Ethernet frame that carries a CPRI data stream. During actual application, a virtual local area network identifier (Vlan ID) in a frame header of the Ethernet frame may be used as the CPRI data identifier. The frame header of the Ethernet frame includes a Vlan field. The Vlan field includes the Vlan ID. For example, a Vlan ID value range is set. When a value of the Vlan ID in the Ethernet frame falls within the Vlan ID value range, the Ethernet frame is identified as an Ethernet frame that carries a CPRI data stream.

The first network apparatus generates the Ethernet frame, where the Ethernet frame includes the segment of the first CPRI data stream. When the Ethernet frame is generated, a first CPRI data segment may be first generated and then the Ethernet frame is generated. Further, the first CPRI data segment is generated by adding a first CPRI header to the segment of the first CPRI data stream. When there is one segment of the first CPRI data stream, the first CPRI header may not include a sequence number. When there are multiple segments of the first CPRI data stream, the first CPRI header may include multiple sequence numbers. The multiple sequence numbers are respectively used to indicate positions of the multiple segments in the first CPRI data stream. The first CPRI header may further include a payload type of the first CPRI data stream and a payload length of the first CPRI data stream. The Ethernet frame is generated by adding an Ethernet frame header and a cyclic redundancy code (CRC) to the first CPRI data segment.

During specific implementation, the Ethernet frame header may further include a multi-protocol label switching (MPLS) Header, and the CPRI data identifier may also be a label switched path (LSP) Label or a pseudo-wire (PW) Label in the MPLS Header.

Optionally, the method further includes determining, by the first network apparatus, a first value according to the frequency of the clock device of the first apparatus and a frequency of a clock device of the first network apparatus, where the first CPRI data stream is sent by the first apparatus, and the Ethernet frame further includes the first value.

For example, the first value may be a function of the frequency of the clock device of the first network apparatus and the frequency of the clock device of the first apparatus. For example, the first value may be a difference between the frequency of the clock device of the first network apparatus and the frequency of the clock device of the first apparatus. Certainly, during actual application, the first value may also be a sum, a product, or a quotient of the frequency of the clock device of the first network apparatus and the frequency of the clock device of the first apparatus. Alternatively, the first network apparatus may store, in advance, a mapping relationship between the first value and both of the frequency of the clock device of the first network apparatus and the frequency of the clock device of the first apparatus. For example, the first network apparatus may store a mapping table in advance, where the mapping table stores a mapping relationship between the first value and an array. The array includes the frequency of the clock device of the first network apparatus and the frequency of the clock device of the first apparatus. The first network apparatus may search the mapping table using the frequency of the clock device of the first network apparatus and the frequency of the clock device of the first apparatus as search keys to obtain the first value. The mapping table may be stored using a database, a linked list, a radix tree, or another data structure.

Optionally, the Ethernet frame further includes a first time, where the first time is a time at which the first network apparatus generates the segment of the first CPRI data stream.

Further, that the Ethernet frame includes the first time may be implemented by that the Ethernet frame includes a timestamp. It may be understood that, when there are multiple segments of the first CPRI data stream, the Ethernet frame may include multiple timestamps. The multiple segments are in a one-to-one correspondence with the multiple timestamps.

Figure 5:
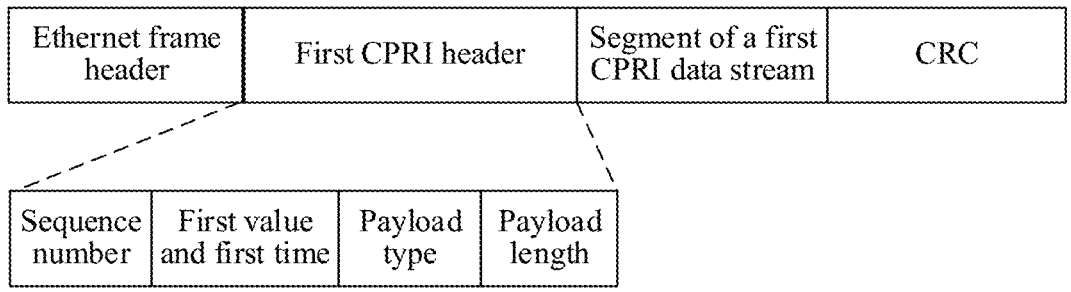
FIG. 5 is a schematic structural diagram of an Ethernet frame according to an embodiment of the present disclosure.

FIG. 5 is a schematic structural diagram of an Ethernet frame. For a structure of the Ethernet frame involved in the foregoing technical solution, reference may be made to FIG. 5.

Optionally, the foregoing technical solution further includes receiving, by the first network apparatus using a CPRI of the first network apparatus, a second CPRI data stream sent by a third apparatus, and generating, by the first network apparatus, a segment of the second CPRI data stream according to the second CPRI data stream, where the Ethernet frame further includes the CPRI data identifier, the segment of the first CPRI data stream, and the segment of the second CPRI data stream.

That is, the first network apparatus not only receives the first CPRI data stream sent by the first apparatus, but also receives the second CPRI data stream sent by the third apparatus. When the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

Figure 6:
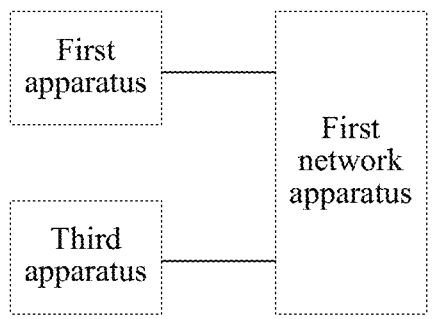
FIG. 6 is a schematic diagram of a manner for connecting a first apparatus, a third apparatus, and a first network apparatus according to an embodiment of the present disclosure.

The first network apparatus receives, using the CPRI of the first network apparatus, the first CPRI data stream sent by the first apparatus, and further receives, using the CPRI of the first network apparatus, the second CPRI data stream sent by the third apparatus. The CPRI, receiving the first CPRI data stream, of the first network apparatus and the CPRI, receiving the second CPRI data stream, of the first network apparatus may be different CPRIs. That is, the first network apparatus is connected to the first apparatus and the third apparatus using different CPRIs, as shown in FIG. 6.

Figure 7:
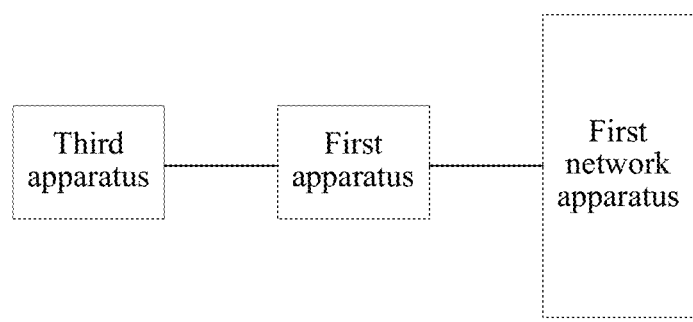
FIG. 7 is a schematic diagram of another manner for connecting a first apparatus, a third apparatus, and a first network apparatus according to an embodiment of the present disclosure.
Figure 8:
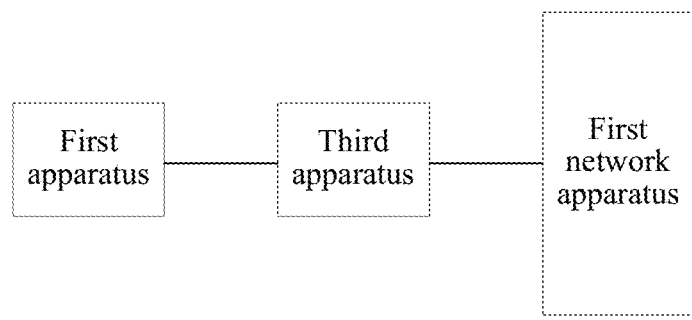
FIG. 8 is a schematic diagram of still another manner for connecting a first apparatus, a third apparatus, and a first network apparatus according to an embodiment of the present disclosure.

The CPRI, receiving the first CPRI data stream, of the first network apparatus and the CPRI, receiving the second CPRI data stream, of the first network apparatus may also be a same CPRI. A possible structure is shown in FIG. 7. The first network apparatus is connected to the first apparatus using the CPRI of the first network apparatus. The third apparatus is connected to the first apparatus. The third apparatus sends the second CPRI data stream to the first apparatus, and the first apparatus sends the first CPRI data stream and the second CPRI data stream to the first network apparatus. Another possible structure is shown in FIG. 8. The first network apparatus is connected to the third apparatus using the CPRI of the first network apparatus. The third apparatus is connected to the first apparatus. The first apparatus sends the first CPRI data stream to the third apparatus, and the third apparatus sends the first CPRI data stream and the second CPRI data stream to the first network apparatus.

Similarly, the second CPRI data stream may be one CPRI data stream or may be multiple CPRI data streams.

The first network apparatus generates the segment of the second CPRI data stream according to the second CPRI data stream. The segment of the second CPRI data stream is a data segment of a preset length. The preset length is set according to a bandwidth of an Ethernet interface of the first network apparatus and the rate at which the first apparatus sends the first CPRI data stream to the first network apparatus. The bandwidth of the Ethernet interface is greater than the rate at which the first apparatus sends the first CPRI data stream to the first network apparatus. In addition, the segment of the second CPRI data stream may include one segment or multiple segments. The multiple segments may be from one CPRI data stream or may be from multiple CPRI data streams.

Optionally, the foregoing technical solution further includes determining, by the first network apparatus, a second value according to a frequency of a clock device of the third apparatus and the frequency of the clock device of the first network apparatus, where the Ethernet frame further includes the second value.

For example, the second value may be a function of the frequency of the clock device of the first network apparatus and the frequency of the clock device of the third apparatus. For example, the second value may be a difference between the frequency of the clock device of the first network apparatus and the frequency of the clock device of the third apparatus. Certainly, during actual application, the second value may also be a sum, a product, or a quotient of the frequency of the clock device of the first network apparatus and the frequency of the clock device of the third apparatus. Alternatively, the first network apparatus may store, in advance, a mapping relationship between the second value and both of the frequency of the clock device of the first network apparatus and the frequency of the clock device of the third apparatus. For example, the first network apparatus may store a mapping table in advance, where the mapping table stores a mapping relationship between the second value and an array. The array includes the frequency of the clock device of the first network apparatus and the frequency of the clock device of the third apparatus. The first network apparatus may search the mapping table using the frequency of the clock device of the first network apparatus and the frequency of the clock device of the third apparatus as search keys, to obtain the second value.

Optionally, the Ethernet frame further includes a second time, where the second time is a time at which the first network apparatus generates the segment of the second CPRI data stream.

Further, that the Ethernet frame includes the second time may be implemented by that the Ethernet frame includes a timestamp. It may be understood that, when there are multiple segments of the second CPRI data stream, the Ethernet frame may include multiple timestamps. The multiple segments are in a one-to-one correspondence with the multiple timestamps.

The first network apparatus generates the Ethernet frame, where the Ethernet frame includes the CPRI data identifier, the segment of the first CPRI data stream, and the segment of the second CPRI data stream. The first network apparatus may generate the Ethernet frame in either of the following two possible implementation manners.

A first possible implementation manner includes generating, by the first network apparatus, the first CPRI data segment and a second CPRI data segment, where the first CPRI data segment includes the segment of the first CPRI data stream and the first CPRI header, the first CPRI header includes the first value and the first time, the second CPRI data segment includes the segment of the second CPRI data stream and a second CPRI header, and the second CPRI header includes the second value and the second time, and generating, by the first network apparatus, a first Ethernet frame and a second Ethernet frame, where the first Ethernet frame includes the first CPRI data segment, the second Ethernet frame includes the second CPRI data segment, and the Ethernet frame includes the first Ethernet frame and the second Ethernet frame.

In the first possible implementation manner, the first network apparatus generates the first CPRI data segment by adding the first CPRI header to the segment of the first CPRI data stream. The first network apparatus generates the first Ethernet frame. The first Ethernet frame includes the first CPRI data segment. The first network apparatus generates the second CPRI data segment by adding the second CPRI header to the segment of the second CPRI data stream. The first network apparatus generates the second Ethernet frame. The second Ethernet frame includes the second CPRI data segment. That is, in the first possible implementation manner, the segment of the first CPRI data stream and the segment of the second CPRI data stream are separately encapsulated into different Ethernet frames. The segment of the first CPRI data stream and the segment of the second CPRI data stream respectively correspond to two Ethernet frame headers and respectively correspond to two CRCs.

Figure 9:
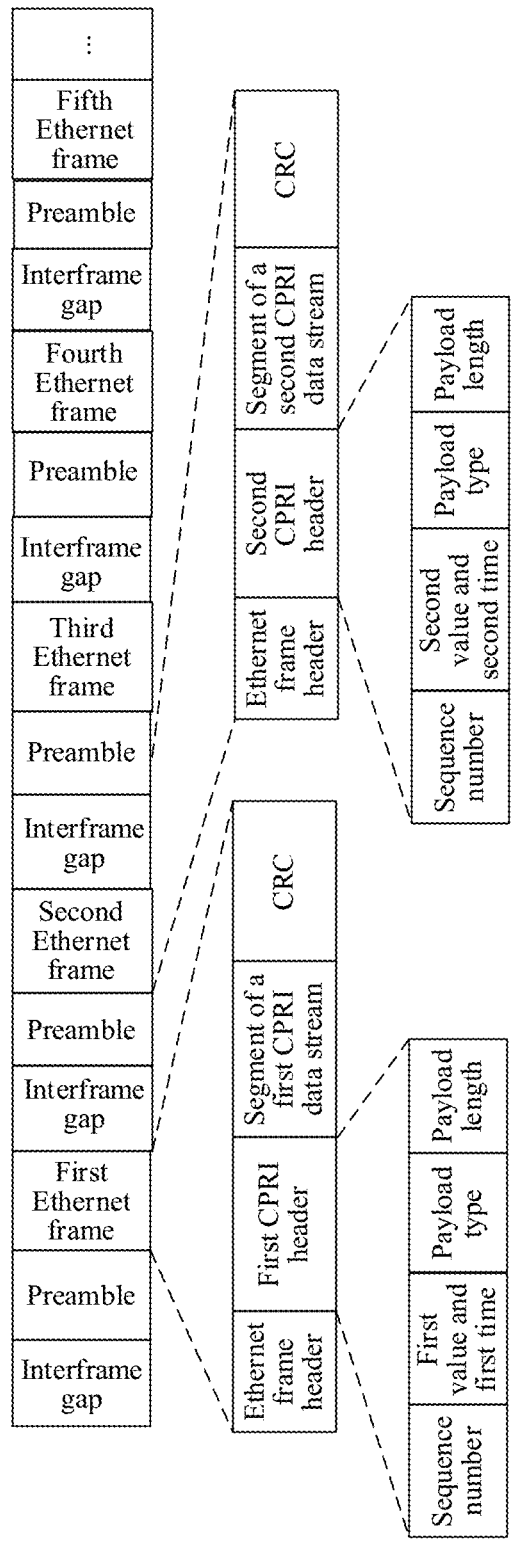
FIG. 9 is a schematic structural diagram in which different segments of a CPRI data stream are separately encapsulated into different Ethernet frames according to an embodiment of the present disclosure.

During actual application, the first network apparatus is not limited to receiving only the first CPRI data stream and the second CPRI data stream. The first network apparatus may further receive a CPRI data stream sent by another apparatus, generate a segment of the CPRI data stream according to the CPRI data stream sent by the other apparatus, and encapsulate the generated segment of the CPRI data stream into another Ethernet frame (which is different from the first Ethernet frame and the second Ethernet frame). As shown in FIG. 9, five segments of the CPRI data stream are separately encapsulated to obtain five Ethernet frames, and the Ethernet frame includes the five Ethernet frames.

A second possible implementation manner includes generating, by the first network apparatus, the first CPRI data segment and a second CPRI data segment, where the first CPRI data segment includes the segment of the first CPRI data stream and the first CPRI header, the first CPRI header includes the first value and the first time, the second CPRI data segment includes the segment of the second CPRI data stream and a second CPRI header, and the second CPRI header includes the second value and the second time, and generating, by the first network apparatus, the Ethernet frame, where the Ethernet frame includes the first CPRI data segment and the second CPRI data segment.

In the second possible implementation manner, the first network apparatus generates the first CPRI data segment by adding the first CPRI header to the segment of the first CPRI data stream. The first network apparatus generates the second CPRI data segment by adding the second CPRI header to the segment of the second CPRI data stream. The first network apparatus generates one Ethernet frame, where the Ethernet frame includes the first CPRI data segment and the second CPRI data segment. That is, in the second possible implementation manner, the segment of the first CPRI data stream and the segment of the second CPRI data stream correspond to a same Ethernet frame header and a same CRC. The segment of the first CPRI data stream and the segment of the second CPRI data stream are encapsulated into the same Ethernet frame.

Figure 10:
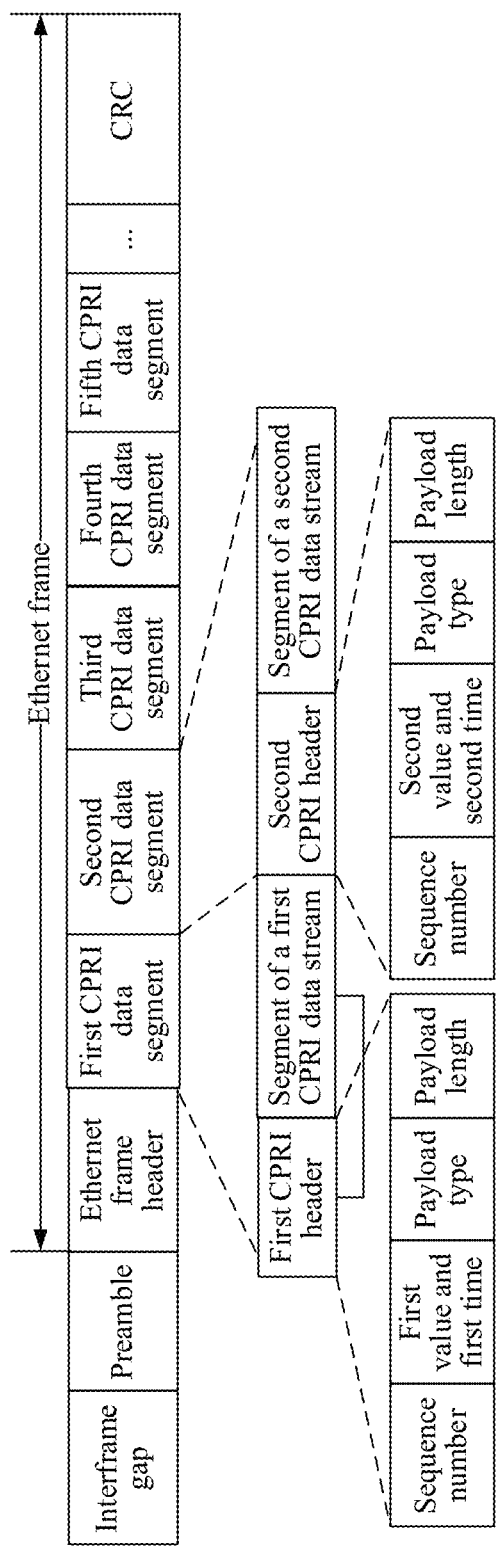
FIG. 10 is a schematic structural diagram in which different segments of a CPRI data stream are all encapsulated into a same Ethernet frame according to an embodiment of the present disclosure.

During actual application, the first network apparatus may be not limited to receiving only the first CPRI data stream and the second CPRI data stream, and may further receive another CPRI data stream. The first network apparatus obtains each segment of the CPRI data stream. The first network apparatus may encapsulate all segments of the received CPRI data stream into a same Ethernet frame. As shown in FIG. 10, the first network apparatus may encapsulate five segments of the CPRI data stream into one Ethernet frame.

In the first possible manner, the first CPRI data segment and the second CPRI data segment are separately encapsulated to obtain two Ethernet frames. The Ethernet frame includes the two Ethernet frames. In the second possible implementation manner, the first CPRI data segment and the second CPRI data segment are encapsulated into one Ethernet frame. Compared with the first possible implementation manner, the second possible implementation manner reduces a network resource required for CPRI data segment transmission.

Step 404: The first network apparatus sends the Ethernet frame to a second network apparatus using an Ethernet interface of the first network apparatus.

The second network apparatus is connected to a second apparatus using a CPRI of the second network apparatus.

When the first apparatus is an RRU, the second apparatus is a BBU, or when the first apparatus is a BBU, the second apparatus is an RRU.

When the first apparatus is an RRU, the second apparatus is a BBU. The first network apparatus receives the first CPRI data stream that is sent by the RRU using the CPRI of the first network apparatus. The first network apparatus sends the Ethernet frame to the second network apparatus using the Ethernet interface. The Ethernet frame includes the segment of the first CPRI data stream. The second network apparatus receives the Ethernet frame, obtains the segment of the first CPRI data stream, and sends the segment of the first CPRI data stream to the BBU. In this way, a CPRI data stream sent by the RRU to the BBU is transmitted using the Ethernet.

When the first apparatus is a BBU, the second apparatus is an RRU. The first network apparatus receives the first CPRI data stream that is sent by the BBU using the CPRI of the first network apparatus. The first network apparatus sends the Ethernet frame to the second network apparatus using the Ethernet interface. The Ethernet frame includes the segment of the first CPRI data stream. The second network apparatus receives the Ethernet frame, obtains the segment of the first CPRI data stream, and sends the segment of the first CPRI data stream to the RRU. In this way, a CPRI data stream sent by the BBU to the RRU is transmitted using the Ethernet.

For example, a bandwidth of the Ethernet interface of the first network apparatus may be a fixed Ethernet interface bandwidth. The first network apparatus may first schedule and transmit each Ethernet frame in the Ethernet frame, and then schedule and transmit a conventional Ethernet frame. All the Ethernet frames in the Ethernet frame have a same quantity of bytes.

In a scenario of the fixed Ethernet interface bandwidth, a total quantity of bytes that can be transmitted in a unit of time is fixed. A quantity of bytes in the conventional Ethernet frame is variable. Different conventional Ethernet frames may have different quantities of bytes. First, a time required for transmitting a conventional Ethernet frame cannot be known, second, for an Ethernet apparatus, when an outbound interface of the Ethernet apparatus completes transmitting a conventional Ethernet frame, an inbound interface of the Ethernet apparatus possibly has not completed receiving or processing a conventional Ethernet frame. In this case, an idle Ethernet frame that does not carry any service data needs to be added between two conventional Ethernet frames to adapt to the Ethernet interface bandwidth. Therefore, in the scenario of the fixed Ethernet interface bandwidth, after a conventional Ethernet frame is scheduled and transmitted, an idle Ethernet frame may be scheduled and transmitted.

In the foregoing technical solution, a quantity of bytes in an Ethernet frame that carries a CPRI data stream is fixed. A scheduling time period may be set, to sequentially schedule Ethernet frames that carry CPRI data streams, to sequentially transmit multiple Ethernet frames that carry CPRI data streams. Therefore, in the scenario of the fixed Ethernet interface bandwidth, the multiple Ethernet frames that carry the CPRI data streams may be first scheduled and transmitted, and then a conventional Ethernet data frame is transmitted. No idle Ethernet frame needs to be added between Ethernet frames that carry CPRI data streams. Therefore, transmission efficiency of the Ethernet interface is improved.

Figure 11:
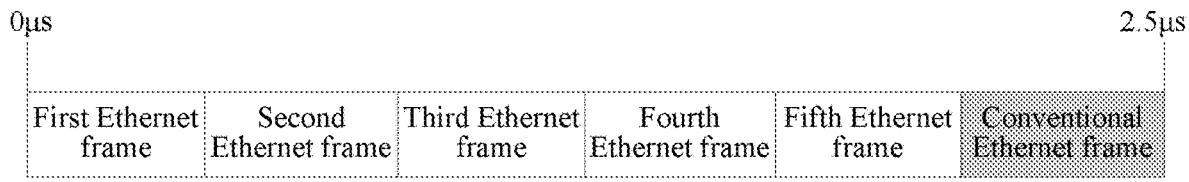
FIG. 11 is a schematic diagram of scheduling and transmission of an Ethernet frame that carries a segment of a CPRI data stream and a conventional Ethernet frame according to an embodiment of the present disclosure.

For example, as shown in FIG. 11, a transmission rate of the Ethernet interface may be 40 gigabits per second, and a quantity of bytes that can be transmitted within 2.5 microseconds (μs) is 12500. The Ethernet interface may transmit multiple Ethernet frames (represented by white) that carry segments of a CPRI data stream. A remaining bandwidth of the Ethernet interface may be used to transmit a conventional Ethernet frame (represented by gray).

Figure 12:
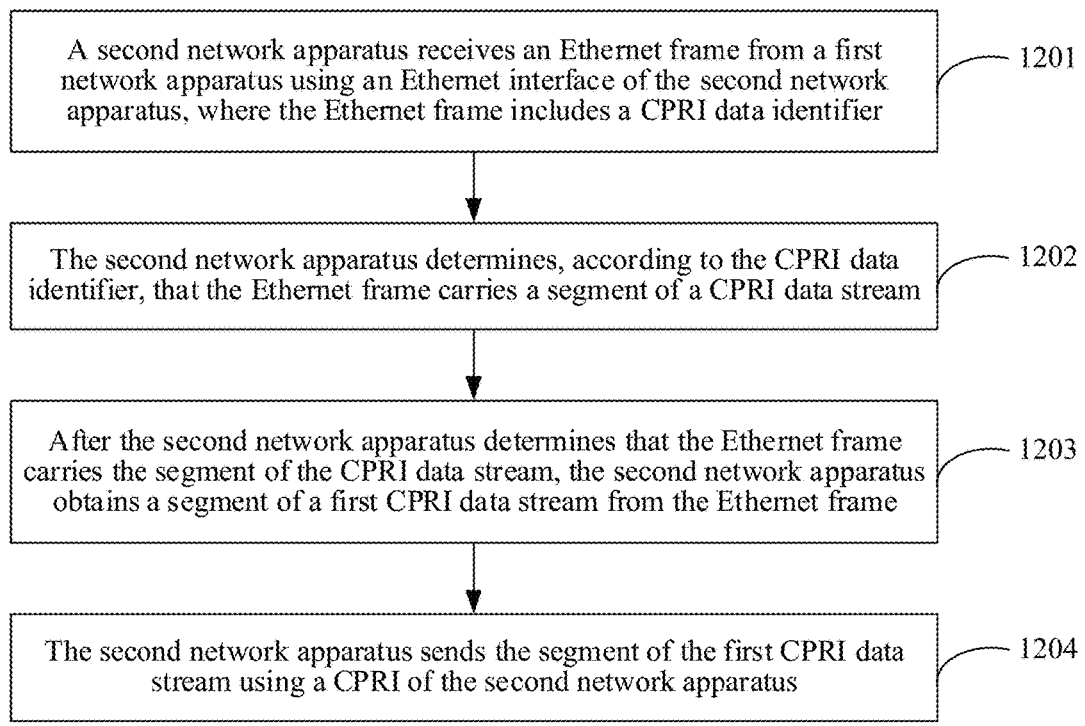
FIG. 12 is a flowchart of a method for receiving an Ethernet frame according to an embodiment of the present disclosure.

FIG. 12 is a flowchart of a method for receiving an Ethernet frame according to an embodiment of the present disclosure. The method shown in FIG. 12 is executed by a second network apparatus. The method shown in FIG. 12 may be a method extended based on the method shown in FIG. 4. The second network apparatus in the method shown in FIG. 12 may be the second network apparatus in the method shown in FIG. 4. The method shown in FIG. 12 includes the following steps.

Step 1201: A second network apparatus receives an Ethernet frame from a first network apparatus using an Ethernet interface of the second network apparatus, where the Ethernet frame includes a CPRI data identifier.

Step 1202: The second network apparatus determines, according to the CPRI data identifier, that the Ethernet frame carries a segment of a CPRI data stream.

Step 1203: After the second network apparatus determines that the Ethernet frame carries the segment of the CPRI data stream, the second network apparatus obtains a segment of a first CPRI data stream from the Ethernet frame.

Step 1204: The second network apparatus sends the segment of the first CPRI data stream using a CPRI of the second network apparatus.

For example, the second network apparatus receives the Ethernet frame using the Ethernet interface, and parses the received Ethernet frame, to determine whether the Ethernet frame carries the CPRI data identifier. There are many possible implementation manners for the second network apparatus to determine whether the Ethernet frame carries the CPRI data identifier.

First possible implementation manner: Set a Vlan ID value range, identify whether a Vlan ID carried in the Ethernet frame received by the second network apparatus falls within the Vlan ID value range, and determine that the Ethernet frame received by the second network apparatus carries the CPRI data identifier when the Vlan ID carried in the Ethernet frame received by the second network apparatus falls within the Vlan ID value range.

Second possible implementation manner: Preset an LSP Label set, identify whether an LSP Label carried in the Ethernet frame received by the second network apparatus belongs to the preset LSP Label set, and determine that the Ethernet frame received by the second network apparatus carries the CPRI data identifier when the LSP Label carried in the Ethernet frame received by the second network apparatus belongs to the preset LSP Label set.

Third possible implementation manner: Preset a PW Label set, identify whether a PW Label carried in the Ethernet frame received by the second network apparatus belongs to the preset PW Label set, and when the PW Label carried in the Ethernet frame received by the second network apparatus belongs to the preset PW Label set, determine that the Ethernet frame received by the second network apparatus carries the CPRI data identifier.

When the Ethernet frame received by the second network apparatus carries the CPRI data identifier, the second network apparatus determines that the Ethernet frame carries the segment of the CPRI data stream. Correspondingly, when the Ethernet frame received by the second network apparatus does not carry the CPRI data identifier, the second network apparatus determines that the Ethernet frame does not carry the segment of the CPRI data stream.

After the second network apparatus determines that the Ethernet frame carries the segment of the CPRI data stream, the second network apparatus obtains the segment of the first CPRI data stream from the Ethernet frame. First, the second network apparatus decapsulates the Ethernet frame, and removes an Ethernet frame header and a CRC to obtain a first CPRI data segment carried in the Ethernet frame. Then the second network apparatus obtains the segment of the first CPRI data stream from the first CPRI data segment.

In a specific embodiment, the first CPRI data stream is received by the first network apparatus using a CPRI of the first network apparatus, and the first CPRI data stream is from a first apparatus, and sending, by the second network apparatus, the segment of the first CPRI data stream using a CPRI of the second network apparatus includes sending, by the second network apparatus, the segment of the first CPRI data stream to a second apparatus using the CPRI of the second network apparatus, where when the first apparatus is an RRU, the second apparatus is a BBU, or when the first apparatus is a BBU, the second apparatus is an RRU.

The first network apparatus receives the first CPRI data stream using the CPRI of the first network apparatus. The first CPRI data stream is from the first apparatus. The first network apparatus generates the segment of the first CPRI data stream according to the first CPRI data stream, and generates the Ethernet frame. The Ethernet frame carries the segment of the first CPRI data stream. The first network apparatus sends the Ethernet frame to the second network apparatus using the Ethernet. For a specific implementation manner, refer to the description of the method for receiving a CPRI data stream shown in FIG. 4. Details are not described herein.

After receiving, using the Ethernet interface, the Ethernet frame that carries the segment of the first CPRI data stream, the second network apparatus obtains the segment of the first CPRI data stream according to the Ethernet frame, and sends the segment of the first CPRI data stream to the second apparatus using the CPRI of the second network apparatus.

It can be learned that, the first apparatus and the first network apparatus are connected. The first network apparatus and the second network apparatus are connected using the Ethernet. The second network apparatus and the second apparatus are connected. When the first apparatus is an RRU, the second apparatus is a BBU, and a CPRI data stream sent by the RRU is sent to the BBU using the Ethernet. When the first apparatus is a BBU, the second apparatus is an RRU, and a CPRI data stream sent by the BBU is sent to the RRU using the Ethernet.

Optionally, the method further includes obtaining, by the second network apparatus, a first value from the Ethernet frame, where the first value is obtained by the first network apparatus according to a frequency of a clock device of the first apparatus and a frequency of a clock device of the first network apparatus, and determining, by the second network apparatus, the frequency of the clock device of the first apparatus according to the first value and a frequency of a clock device of the second network apparatus, where the frequency of the clock device of the first network apparatus is equal to the frequency of the clock device of the second network apparatus, and sending, by the second network apparatus, the segment of the first CPRI data stream using a CPRI of the second network apparatus includes sending, by the second network apparatus, the segment of the first CPRI data stream to the second apparatus using the CPRI of the second network apparatus, where a rate at which the second network apparatus sends the segment of the first CPRI data stream is equal to a product of the frequency of the clock device of the first apparatus and a bit width of the CPRI of the second network apparatus.

In the method for receiving a CPRI data stream shown in FIG. 4, the first network apparatus determines the first value according to the frequency of the clock device of the first apparatus and the frequency of the clock device of the first network apparatus. The Ethernet frame includes the first value. The first network apparatus sends the Ethernet frame to the second network apparatus using the Ethernet. For a specific implementation manner, refer to the description of the method for receiving a CPRI data stream shown in FIG. 4. Details are not described herein. The second network apparatus receives the Ethernet frame, and obtains the first value from the Ethernet frame. The frequency of the clock device of the first network apparatus is the same as the frequency of the clock device of the second network apparatus. The second network apparatus determines the frequency of the clock device of the first apparatus according to the first value and the frequency of the clock device of the second network apparatus.

The rate (a unit may be bit/second) at which the second network apparatus sends the segment of the first CPRI data stream to the second apparatus is equal to the product of the frequency of the clock device of the first apparatus and the bit width of the CPRI of the second network apparatus. In this case, the rate at which the second network apparatus sends the segment of the first CPRI data stream to the second apparatus is the same as a rate at which the first apparatus sends the segment of the first CPRI data stream to the second apparatus via a fiber that connects the first apparatus to the second apparatus directly such that the second apparatus receives the segment of the first CPRI data stream at a fixed rate. That is, although a CPRI data stream sent by the first apparatus is transmitted to the second apparatus using the Ethernet, a rate at which the second apparatus receives the CPRI data stream does not need to be changed. The second apparatus may receive, at a rate at which the segment of the first CPRI data stream is received from the first apparatus via a fiber that connects the first apparatus to the second apparatus directly, the segment of the first CPRI data stream sent by the second network apparatus.

Optionally, the method further includes obtaining, by the second network apparatus, a first time from the Ethernet frame, where the first time is a time at which the first network apparatus generates the segment of the first CPRI data stream, determining, by the second network apparatus, a first latency according to the first time and a third time, where the third time is a time at which the second network apparatus obtains the segment of the first CPRI data stream, and determining, by the second network apparatus, a fifth time according to the first latency, and sending, by the second network apparatus, the segment of the first CPRI data stream using a CPRI of the second network apparatus includes sending, by the second network apparatus, the segment of the first CPRI data stream to the second apparatus at the fifth time using the CPRI of the second network apparatus.

The second network apparatus obtains the first time carried in the Ethernet frame, obtains the third time at which the second network apparatus obtains the segment of the first CPRI data stream, and obtains the first latency according to a difference between the third time and the first time. The first latency is used to measure a time period taken to transmit the segment of the first CPRI data stream from the first network apparatus to the second network apparatus using the Ethernet.

The second network apparatus determines the fifth time according to the first latency, and the second network apparatus sends the segment of the first CPRI data stream to the second apparatus at the fifth time using the CPRI of the second network apparatus. That is, the fifth time is a moment at which the second network apparatus sends the segment of the first CPRI data stream to the second apparatus. The second network apparatus determines the fifth time, which can relieve a problem of a jitter and a latency occurring when the segment of the first CPRI data stream is transmitted from the first apparatus to the second apparatus using the Ethernet. It is assumed that a time required by the first apparatus to transmit a CPRI data stream to the second apparatus using the Ethernet is a first time period, and a time required by the second apparatus to transmit a CPRI data stream to the first apparatus using the Ethernet is a second time period. The second network apparatus determines the fifth time such that the first time period is equal to the second time period.

Optionally, the method further includes obtaining, by the second network apparatus, a segment of a second CPRI data stream from the Ethernet frame, where the second CPRI data stream is received by the first network apparatus using a CPRI of the first network apparatus, and the second CPRI data stream is from a third apparatus, and sending, by the second network apparatus, the segment of the second CPRI data stream to the second apparatus using a CPRI of the second network apparatus, where when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

In the method for receiving a CPRI data stream shown in FIG. 4, the first network apparatus further receives the second CPRI data stream using the CPRI of the first network apparatus, where the second CPRI data stream is from the third apparatus. The first network apparatus obtains the segment of the second CPRI data stream, generates the Ethernet frame, and sends the Ethernet frame to the second network apparatus using the Ethernet. The Ethernet frame not only carries the segment of the first CPRI data stream, but also carries the segment of the second CPRI data stream. For a specific implementation manner, refer to the description in the method for receiving a CPRI data stream shown in FIG. 4. Details are not described herein.

After receiving the Ethernet frame using the Ethernet interface of the second network apparatus, the second network apparatus not only can obtain the segment of the first CPRI data stream, but also can obtain the segment of the second CPRI data stream, and the second network apparatus sends the segment of the second CPRI data stream to the second apparatus.

Optionally, the method further includes obtaining, by the second network apparatus, a second value from the Ethernet frame, where the second value is obtained by the first network apparatus according to a frequency of a clock device of the third apparatus and the frequency of the clock device of the first network apparatus, and determining, by the second network apparatus, the frequency of the clock device of the third apparatus according to the second value and the frequency of the clock device of the second network apparatus, where the frequency of the clock device of the first network apparatus is equal to the frequency of the clock device of the second network apparatus, and sending, by the second network apparatus, the segment of the second CPRI data stream to the second apparatus using a CPRI of the second network apparatus includes sending, by the second network apparatus, the segment of the second CPRI data stream to the second apparatus using the CPRI of the second network apparatus, where a rate at which the second network apparatus sends the segment of the second CPRI data stream is equal to a product of the frequency of the clock device of the third apparatus and a bit width of the CPRI of the second network apparatus.

The second value is obtained by the first network apparatus according to the frequency of the clock device of the third apparatus and the frequency of the clock device of the first network apparatus, and the Ethernet frame further carries the second value. The second network apparatus obtains the second value from the Ethernet frame. Because the frequency of the clock device of the first network apparatus is the same as the frequency of the clock device of the second network apparatus, the second network apparatus may determine the frequency of the clock device of the third apparatus according to the second value and the frequency of the clock device of the second network apparatus.

The rate at which the second network apparatus sends the segment of the second CPRI data stream is equal to the product of the frequency of the clock device of the third apparatus and the bit width of the CPRI of the second network apparatus. In this case, the rate at which the second network apparatus sends the segment of the second CPRI data stream to the second apparatus is the same as a rate at which the third apparatus directly sends the segment of the second CPRI data stream to the second apparatus such that the second apparatus receives the segment of the second CPRI data stream at a fixed rate. That is, although a CPRI data stream sent by the third apparatus is transmitted to the second apparatus using the Ethernet, a rate at which the second apparatus receives the CPRI data stream does not need to be changed. The second apparatus may receive, at a rate at which the segment of the second CPRI data stream is received from the third apparatus, the segment of the second CPRI data stream sent by the second network apparatus.

Optionally, the method further includes obtaining, by the second network apparatus, a second time from the Ethernet frame, where the second time is a time at which the first network apparatus generates the segment of the second CPRI data stream, determining, by the second network apparatus, a second latency according to the second time and a fourth time, where the fourth time is a time at which the second network apparatus obtains the segment of the second CPRI data stream, and determining, by the second network apparatus, a sixth time according to the second latency, and sending, by the second network apparatus, the segment of the second CPRI data stream to the second apparatus using a CPRI of the second network apparatus includes sending, by the second network apparatus, the segment of the second CPRI data stream to the second apparatus at the sixth time using the CPRI of the second network apparatus.

The second network apparatus obtains the second time carried in the Ethernet frame, obtains the fourth time at which the second network apparatus obtains the segment of the second CPRI data stream, and obtains the second latency according to a difference between the fourth time and the second time. The second latency is used to measure a time period taken to transmit the segment of the second CPRI data stream from the first network apparatus to the second network apparatus using the Ethernet.

The second network apparatus determines the sixth time according to the second latency, and the second network apparatus sends the segment of the second CPRI data stream to the second apparatus at the sixth time using the CPRI of the second network apparatus. That is, the sixth time is a moment at which the second network apparatus sends the segment of the second CPRI data stream to the second apparatus. The second network apparatus determines the sixth time, which can relieve a jitter and a latency occurring when the segment of the second CPRI data stream is transmitted from the third apparatus to the second apparatus using the Ethernet. It is assumed that a time required by the third apparatus to transmit a CPRI data stream to the second apparatus using the Ethernet is a third time period, and a time required by the second apparatus to transmit a CPRI data stream to the third apparatus using the Ethernet is a fourth time period. The second network apparatus determines the sixth time such that the third time period is equal to the fourth time period.

It should be noted herein that, generally, the CPRI used by the second network apparatus to send the segment of the first CPRI data stream to the second apparatus is different from the CPRI used by the second network apparatus to send the segment of the second CPRI data stream to the second apparatus.

There are at least two possible implementation manners for the second network apparatus to obtain the segment of the first CPRI data stream and the segment of the second CPRI data stream according to the Ethernet frame.

A first possible implementation manner includes obtaining, by the second network apparatus, the first CPRI data segment and a second CPRI data segment from the Ethernet frame, where the Ethernet frame includes a first Ethernet frame, the first Ethernet frame includes the first CPRI data segment, the Ethernet frame includes a second Ethernet frame, and the second Ethernet frame includes the second CPRI data segment, obtaining, by the second network apparatus, the segment of the first CPRI data stream and a first CPRI header from the first CPRI data segment, and obtaining the segment of the second CPRI data stream and a second CPRI header from the second CPRI data segment, where the first CPRI header includes the first value and the first time, and the second CPRI header includes the second value and the second time.

In the first possible implementation manner, the Ethernet frame includes the first Ethernet frame and the second Ethernet frame. The second network apparatus separately decapsulates the first Ethernet frame and the second Ethernet frame in the Ethernet frame. The second network apparatus decapsulates the first Ethernet frame, and removes an Ethernet frame header and a CRC to obtain the first CPRI data segment, and decapsulates the second Ethernet frame, and removes an Ethernet frame header and a CRC to obtain the second CPRI data segment.

Certainly, the Ethernet frame may further include more segments of a CPRI data stream, where each segment of the CPRI data stream is independently encapsulated into one Ethernet frame. An Ethernet frame shown in FIG. 9 is used as an example. The Ethernet frame includes five Ethernet frames, and each Ethernet frame includes one segment of the CPRI data stream. The second network apparatus separately decapsulates the five Ethernet frames, and may obtain five segments of the CPRI data stream.

A second possible implementation manner includes obtaining, by the second network apparatus, the first CPRI data segment and a second CPRI data segment from the Ethernet frame, and obtaining, by the second network apparatus, the segment of the first CPRI data stream and a first CPRI header from the first CPRI data segment, and obtaining the segment of the second CPRI data stream and a second CPRI header from the second CPRI data segment, where the first CPRI header includes the first value and the first time, and the second CPRI header includes the second value and the second time.

In the second possible implementation manner, the segment of the first CPRI data stream and the segment of the second CPRI data stream are both encapsulated into a same Ethernet frame. The second network apparatus may obtain the segment of the first CPRI data stream and the segment of the second CPRI data stream by decapsulating the Ethernet frame and removing an Ethernet frame header and a CRC.

Certainly, the Ethernet frame may further include more segments of a CPRI data stream, where all segments of the CPRI data stream are encapsulated into a same Ethernet frame. An Ethernet frame shown in FIG. 10 is used as an example. There is one Ethernet frame in the Ethernet frame, and the Ethernet frame includes five segments of the CPRI data stream. The second network apparatus decapsulates the Ethernet frame, and may obtain the five segments of the CPRI data stream.

It can be learned from the foregoing content that the present disclosure has the following beneficial effects.

A first network apparatus receives a first CPRI data stream using a CPRI of the first network apparatus, the first network apparatus generates an Ethernet frame, where the Ethernet frame includes a segment of the first CPRI data stream, and the first network apparatus sends the Ethernet frame to a second network apparatus using the Ethernet, and the second network apparatus obtains the segment of the first CPRI data stream according to the Ethernet frame, and sends the segment of the first CPRI data stream to a second apparatus using a CPRI of the second network apparatus. In this way, a method for transmitting a CPRI data stream using the Ethernet is provided.

Figure 13:
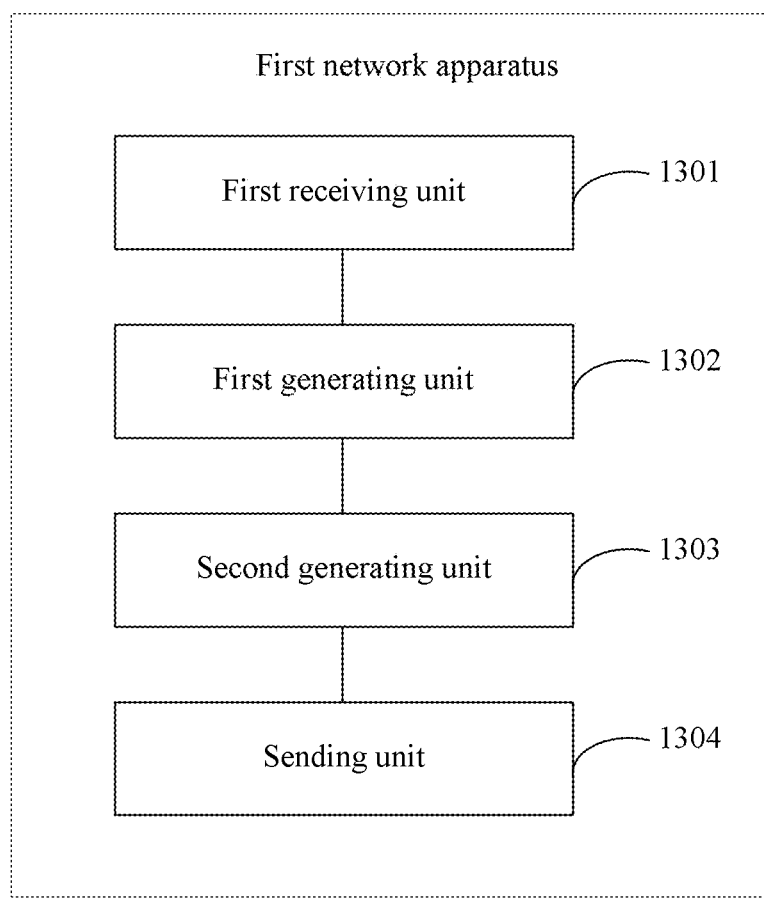
FIG. 13 is a schematic structural diagram of a first network apparatus for receiving a CPRI data stream according to an embodiment of the present disclosure.

FIG. 13 is a schematic structural diagram of a first network apparatus for receiving a CPRI data stream according to an embodiment of the present disclosure. The first network apparatus shown in FIG. 13 may be configured to execute the method shown in FIG. 4. The first network apparatus shown in FIG. 13 is a first network apparatus corresponding to the method for receiving a CPRI data stream shown in FIG. 4. The first network apparatus includes a first receiving unit 1301, a first generating unit 1302, a second generating unit 1303, and a sending unit 1304, where the first receiving unit 1301 is configured to receive a first CPRI data stream using a CPRI of the first network apparatus. The first generating unit 1302 is configured to generate a segment of the first CPRI data stream according to the first CPRI data stream received by the first receiving unit 1301. The second generating unit 1303 is configured to generate an Ethernet frame, where the Ethernet frame includes the segment of the first CPRI data stream generated by the first generating unit 1302 and a CPRI data identifier, and the CPRI data identifier is used to indicate that the Ethernet frame carries CPRI data, and the sending unit 1304 is configured to send the Ethernet frame generated by the second generating unit 1303 to a second network apparatus using an Ethernet interface of the first network apparatus.

Optionally, the first network apparatus further includes a first determining unit (not shown) configured to determine a first value according to a frequency of a clock device of a first apparatus and a frequency of a clock device of the first network apparatus, where the first CPRI data stream is sent by the first apparatus, and the Ethernet frame further includes the first value.

Optionally, the Ethernet frame further includes a first time, where the first time is a time at which the first network apparatus generates the segment of the first CPRI data stream.

Optionally, the second network apparatus is connected to a second apparatus using a CPRI of the second network apparatus, and when the first apparatus is an RRU, the second apparatus is a BBU, or when the first apparatus is a BBU, the second apparatus is an RRU.

Optionally, the first network apparatus further includes a second receiving unit (not shown) and a third generating unit (not shown), where the second receiving unit is configured to receive, using a CPRI of the first network apparatus, a second CPRI data stream sent by a third apparatus, and the third generating unit is configured to generate a segment of the second CPRI data stream according to the second CPRI data stream received by the second receiving unit, where the Ethernet frame further includes the CPRI data identifier, the segment of the first CPRI data stream, and the segment of the second CPRI data stream, and when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

Optionally, the first network apparatus further includes a second determining unit (not shown) configured to determine a second value according to a frequency of a clock device of the third apparatus and the frequency of the clock device of the first network apparatus, where the Ethernet frame further includes the second value.

Optionally, the Ethernet frame further includes a second time, where the second time is a time at which the first network apparatus generates the segment of the second CPRI data stream.

Optionally, the second generating unit 1303 includes a first generating subunit and a second generating subunit, where the first generating subunit is configured to generate a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and the second generating subunit is configured to generate a first Ethernet frame and a second Ethernet frame, where the first Ethernet frame includes the first CPRI data segment generated by the first generating subunit, the second Ethernet frame includes the second CPRI data segment generated by the first generating subunit, and the Ethernet frame includes the first Ethernet frame and the second Ethernet frame.

Optionally, the second generating unit 1303 includes a third generating subunit and a fourth generating subunit, where the third generating subunit is configured to generate a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and the fourth generating subunit is configured to generate the Ethernet frame, where the Ethernet frame includes the first CPRI data segment generated by the third generating subunit and the second CPRI data segment generated by the third generating subunit.

The first network apparatus shown in FIG. 13 is the first network apparatus corresponding to the method for receiving a CPRI data stream shown in FIG. 4. For specific implementation, refer to the description in the method for receiving a CPRI data stream shown in FIG. 4. Details are not described herein.

Figure 14:
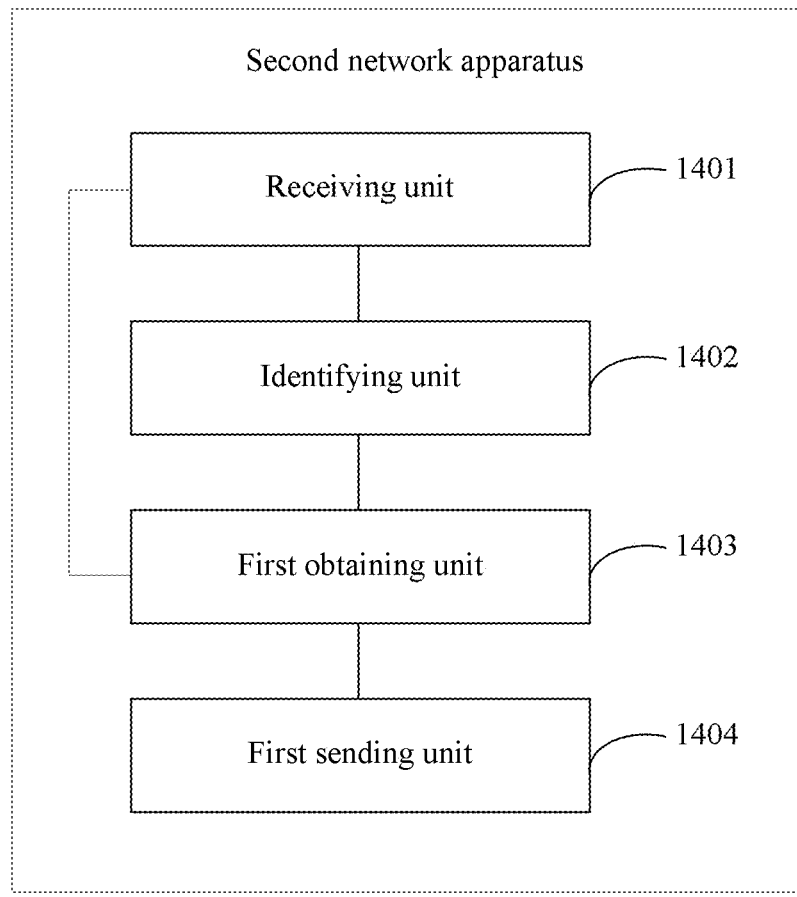
FIG. 14 is a schematic structural diagram of a second network apparatus for receiving an Ethernet frame according to an embodiment of the present disclosure.

FIG. 14 is a schematic structural diagram of a second network apparatus for receiving an Ethernet frame according to an embodiment of the present disclosure. The second network apparatus may be configured to execute the method shown in FIG. 12. The second network apparatus shown in FIG. 14 is a second network apparatus corresponding to the method for receiving an Ethernet frame shown in FIG. 12. The second network apparatus includes a receiving unit 1401, an identifying unit 1402, a first obtaining unit 1403, and a first sending unit 1404, where the receiving unit 1401 is configured to receive an Ethernet frame from a first network apparatus using an Ethernet interface of the second network apparatus, where the Ethernet frame includes a CPRI data identifier, the identifying unit 1402 is configured to determine, according to the CPRI data identifier, that the Ethernet frame received by the receiving unit 1401 carries a segment of a CPRI data stream, the first obtaining unit 1403 is configured to obtain a segment of a first CPRI data stream from the Ethernet frame received by the receiving unit 1401 after the identifying unit 1402 determines that the Ethernet frame carries the segment of the CPRI data stream, and the first sending unit 1404 is configured to send, using a CPRI of the second network apparatus, the segment of the first CPRI data stream obtained by the first obtaining unit 1403.

Optionally, the first CPRI data stream is received by the first network apparatus using a CPRI of the first network apparatus, and the first CPRI data stream is from a first apparatus, and the first sending unit 1404 is further configured to send the segment of the first CPRI data stream obtained by the first obtaining unit 1403 to a second apparatus using the CPRI of the second network apparatus, where when the first apparatus is an RRU, the second apparatus is a BBU, or when the first apparatus is a BBU, the second apparatus is an RRU.

Optionally, the second network apparatus further includes a second obtaining unit (not shown) configured to obtain a first value from the Ethernet frame received by the receiving unit 1401, where the first value is obtained by the first network apparatus according to a frequency of a clock device of the first apparatus and a frequency of a clock device of the first network apparatus, and a first determining unit (not shown) configured to determine the frequency of the clock device of the first apparatus according to the first value obtained by the second obtaining unit and a frequency of a clock device of the second network apparatus, where the frequency of the clock device of the first network apparatus is equal to the frequency of the clock device of the second network apparatus, where the first sending unit 1404 is further configured to send the segment of the first CPRI data stream to the second apparatus using the CPRI of the second network apparatus, where a rate at which the second network apparatus sends the segment of the first CPRI data stream is equal to a product of the frequency, determined by the first determining unit, of the clock device of the first apparatus and a bit width of the CPRI of the second network apparatus.

Optionally, the second network apparatus further includes a third obtaining unit (not shown) configured to obtain a first time from the Ethernet frame received by the receiving unit 1401, where the first time is a time at which the first network apparatus generates the segment of the first CPRI data stream, a second determining unit (not shown) configured to determine a first latency according to the first time obtained by the third obtaining unit and a third time, where the third time is a time at which the second network apparatus obtains the segment of the first CPRI data stream, and a third determining unit (not shown) configured to determine a fifth time according to the first latency determined by the second determining unit, where the first sending unit 1404 is further configured to send, using the CPRI of the second network apparatus, the segment of the first CPRI data stream to the second apparatus at the fifth time determined by the third determining unit.

Optionally, the first obtaining unit 1403 is further configured to obtain a segment of a second CPRI data stream from the Ethernet frame, where the second CPRI data stream is received by the first network apparatus using a CPRI of the first network apparatus, and the second CPRI data stream is from a third apparatus, and the second network apparatus further includes a second sending unit (not shown) configured to send the segment of the second CPRI data stream obtained by the first obtaining unit 1403 to the second apparatus using a CPRI of the second network apparatus, where when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

Optionally, the second network apparatus further includes a fourth obtaining unit (not shown) configured to obtain a second value from the Ethernet frame received by the receiving unit 1401, where the second value is obtained by the first network apparatus according to a frequency of a clock device of the third apparatus and the frequency of the clock device of the first network apparatus, and a fourth determining unit (not shown) configured to determine the frequency of the clock device of the third apparatus according to the second value obtained by the fourth obtaining unit and the frequency of the clock device of the second network apparatus, where the frequency of the clock device of the first network apparatus is equal to the frequency of the clock device of the second network apparatus, where the second sending unit is further configured to send the segment of the second CPRI data stream to the second apparatus using the CPRI of the second network apparatus, where a rate at which the second network apparatus sends the segment of the second CPRI data stream is equal to a product of the frequency, determined by the fourth determining unit, of the clock device of the third apparatus and a bit width of the CPRI of the second network apparatus.

Optionally, the second network apparatus further includes a fifth obtaining unit (not shown) configured to obtain a second time from the Ethernet frame received by the receiving unit 1401, where the second time is a time at which the first network apparatus generates the segment of the second CPRI data stream, a fifth determining unit (not shown) configured to determine a second latency according to the second time obtained by the fifth obtaining unit and a fourth time, where the fourth time is a time at which the second network apparatus obtains the segment of the second CPRI data stream, and a sixth determining unit (not shown) configured to determine a sixth time according to the second latency determined by the fifth determining unit, where the second sending unit is further configured to send, using the CPRI of the second network apparatus, the segment of the second CPRI data stream to the second apparatus at the sixth time determined by the sixth determining unit.

Optionally, the first obtaining unit 1403 includes a first obtaining subunit and a second obtaining subunit, where the first obtaining subunit is configured to obtain a first CPRI data segment and a second CPRI data segment from the Ethernet frame received by the receiving unit 1401, where the Ethernet frame includes a first Ethernet frame, the first Ethernet frame includes the first CPRI data segment, the Ethernet frame includes a second Ethernet frame, and the second Ethernet frame includes the second CPRI data segment, and the second obtaining subunit is configured to obtain the segment of the first CPRI data stream and a first CPRI header from the first CPRI data segment obtained by the first obtaining subunit, and obtain the segment of the second CPRI data stream and a second CPRI header from the second CPRI data segment obtained by the first obtaining subunit, where the first CPRI header includes the first value and the first time, and the second CPRI header includes the second value and the second time.

Optionally, the first obtaining unit 1403 includes a third obtaining subunit and a fourth obtaining subunit, where the third obtaining subunit is configured to obtain a first CPRI data segment and a second CPRI data segment from the Ethernet frame received by the receiving unit 1401, and the fourth obtaining subunit is configured to obtain the segment of the first CPRI data stream and a first CPRI header from the first CPRI data segment obtained by the third obtaining subunit, and obtain the segment of the second CPRI data stream and a second CPRI header from the second CPRI data segment obtained by the third obtaining subunit, where the first CPRI header includes the first value and the first time, and the second CPRI header includes the second value and the second time.

The second network apparatus shown in FIG. 14 is the second network apparatus corresponding to the method for receiving an Ethernet frame shown in FIG. 12. For specific implementation, refer to the description in the method for receiving an Ethernet frame shown in FIG. 12. Details are not described herein.

Figure 15:
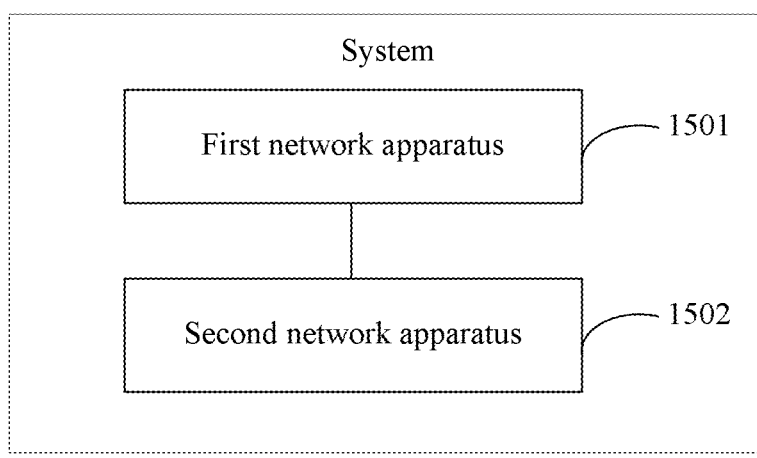
FIG. 15 is a schematic structural diagram of a system for transmitting a CPRI data stream according to an embodiment of the present disclosure.

FIG. 15 is a schematic structural diagram of a system for transmitting a CPRI data stream according to an embodiment of the present disclosure. The system includes a first network apparatus 1501 for receiving a CPRI data stream described in FIG. 13, and a second network apparatus 1502 for receiving an Ethernet frame described in FIG. 14. The first network apparatus 1501 and the second network apparatus 1502 are connected using the Ethernet.

The first network apparatus 1501 is connected to a first apparatus, and the second network apparatus 1502 is connected to a second apparatus. The first network apparatus 1501 receives a first CPRI data stream sent by the first apparatus, encapsulates a segment of the first CPRI data stream into an Ethernet frame, and sends the Ethernet frame to the second network apparatus 1502 using the Ethernet. The second network apparatus 1502 obtains the segment of the first CPRI data stream according to the Ethernet frame, and sends the segment of the first CPRI data stream to the second apparatus.

For specific implementation of the first network apparatus 1501, refer to FIG. 4 and the corresponding embodiment and FIG. 13 and the corresponding embodiment. For specific implementation of the second network apparatus 1502, refer to FIG. 12 and the corresponding embodiment and FIG. 14 and the corresponding embodiment.

Figure 16:
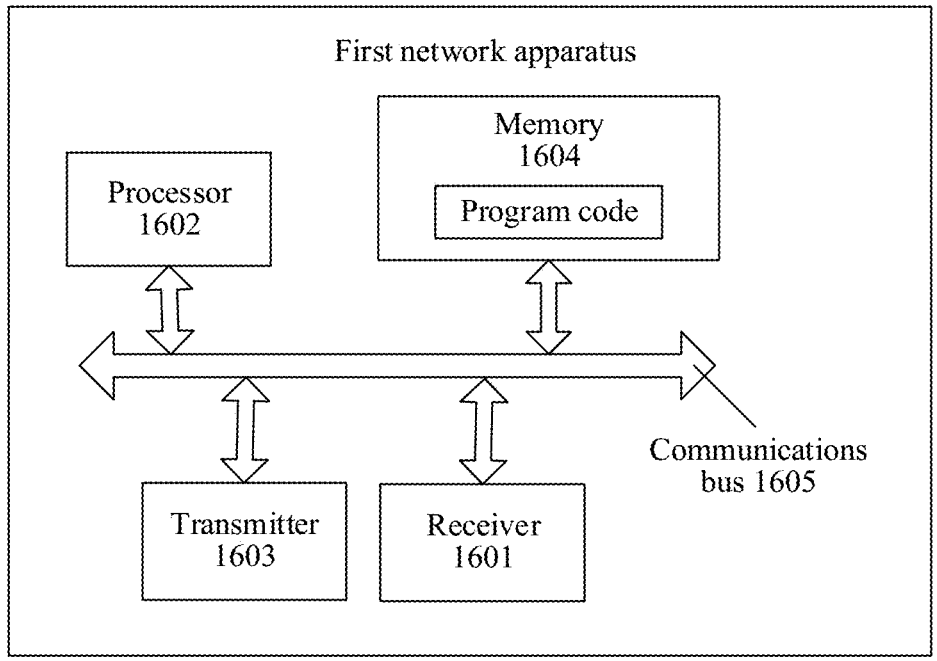
FIG. 16 is a schematic diagram of a hardware structure of a first network apparatus for receiving a CPRI data stream according to an embodiment of the present disclosure.

FIG. 16 is a schematic diagram of a hardware structure of a first network apparatus for receiving a CPRI data stream according to an embodiment of the present disclosure. The first network apparatus shown in FIG. 16 is a first network apparatus corresponding to the method for receiving a CPRI data stream shown in FIG. 4. The first network apparatus includes a receiver 1601, a processor 1602, a transmitter 1603, a memory 1604, and a communications bus 1605. The receiver 1601, the processor 1602, the transmitter 1603, and the memory 1604 communicate with each other using the communications bus 1605.

The receiver 1601 is configured to implement a function of the first receiving unit 1301 shown in the FIG. 13. The transmitter 1603 is configured to implement a function of the sending unit 1304 shown in the FIG. 13. The memory 1604 is configured to store instructions that can be implemented by the first generating unit 1302 and the second generating unit 1303 shown in the FIG. 13. The processor 1602 is configured to invoke, from the memory 1604, the instructions that can be implemented by the first generating unit 1302 and the second generating unit 1303 shown in the FIG. 13 and execute the instructions.

The receiver 1601 is configured to receive a first CPRI data stream using a CPRI of the first network apparatus.

The memory 1604 is configured to store program code. The processor 1602 is configured to execute, by reading the program code stored in the memory 1604, the operations of generating a segment of the first CPRI data stream according to the first CPRI data stream, generating an Ethernet frame, where the Ethernet frame includes the segment of the first CPRI data stream and a CPRI data identifier, and the CPRI data identifier is used to indicate that the Ethernet frame carries CPRI data.

The transmitter 1603 is configured to send the Ethernet frame to a second network apparatus using an Ethernet interface of the first network apparatus.

For example, the receiver 1601 may be implemented using an interface card. The transmitter 1603 may be implemented using an interface card. The receiver 1601 includes an interface that can receive a CPRI data stream. The transmitter 1603 includes an interface that can send an Ethernet frame. The interface that can receive a CPRI data stream and the interface that can send an Ethernet frame may be serial advanced technology attachments (SATA), external SATA (eSATA), universal serial buses (USB), firewires, small computer system interfaces (SCSI), or fiber channels.

For example, the processor 1602 may be a combination of software and hardware, or may be firmware. For example, the processor 1602 may be a programmable processor, a general purpose processor, an integrated circuit, an application specific integrated circuit (ASIC), a field programmable gate array (FPGA), or a digital signal processor (DSP).

For example, the memory 1604 may be a random access memory (RAM), a read-only memory (ROM), a flash memory, or a solid state hard drive.

Optionally, the processor 1602 is further configured to determine a first value according to a frequency of a clock device of a first apparatus and a frequency of a clock device of the first network apparatus, where the first CPRI data stream is sent by the first apparatus, and the Ethernet frame further includes the first value.

Optionally, the Ethernet frame further includes a first time, where the first time is a time at which the first network apparatus generates the segment of the first CPRI data stream.

Optionally, the second network apparatus is connected to a second apparatus using a CPRI of the second network apparatus, and when the first apparatus is an RRU, the second apparatus is a BBU, or when the first apparatus is a BBU, the second apparatus is an RRU.

Optionally, the receiver 1601 is further configured to receive, using a CPRI of the first network apparatus, a second CPRI data stream sent by a third apparatus, and the processor 1602 is further configured to generate a segment of the second CPRI data stream according to the second CPRI data stream, where the Ethernet frame further includes the CPRI data identifier, the segment of the first CPRI data stream, and the segment of the second CPRI data stream, and when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

Optionally, the processor 1602 is further configured to determine a second value according to a frequency of a clock device of the third apparatus and the frequency of the clock device of the first network apparatus, where the Ethernet frame further includes the second value.

Optionally, the Ethernet frame further includes a second time, where the second time is a time at which the first network apparatus generates the segment of the second CPRI data stream.

Optionally, that the processor 1602 is configured to generate the Ethernet frame includes generating a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and generating a first Ethernet frame and a second Ethernet frame, where the first Ethernet frame includes the first CPRI data segment, the second Ethernet frame includes the second CPRI data segment, and the Ethernet frame includes the first Ethernet frame and the second Ethernet frame, or generating a first CPRI data segment and a second CPRI data segment, where the first CPRI data segment includes the segment of the first CPRI data stream and a first CPRI header, the first CPRI header includes the first value and the first time, the second CPRI data segment includes the segment of the second CPRI data stream and a second CPRI header, and the second CPRI header includes the second value and the second time, and generating the Ethernet frame, where the Ethernet frame includes the first CPRI data segment and the second CPRI data segment.

The first network apparatus shown in FIG. 16 is the first network apparatus corresponding to the method for receiving a CPRI data stream shown in FIG. 4. For specific implementation, refer to the description in the method for receiving a CPRI data stream shown in FIG. 4. Details are not described herein.

Figure 17:
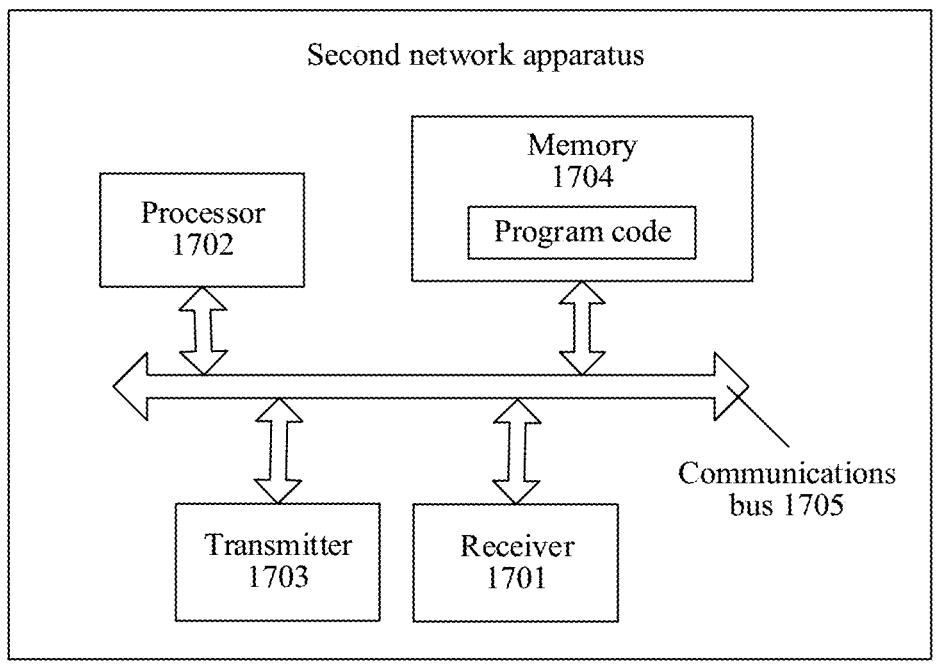
FIG. 17 is a schematic diagram of a hardware structure of a second network apparatus for receiving an Ethernet frame according to an embodiment of the present disclosure.

FIG. 17 is a schematic diagram of a hardware structure of a second network apparatus for receiving an Ethernet frame according to an embodiment of the present disclosure. The second network apparatus shown in FIG. 17 is a second network apparatus corresponding to the method for receiving an Ethernet frame shown in FIG. 12. The second network apparatus includes a receiver 1701, a processor 1702, a transmitter 1703, a memory 1704, and a communications bus 1705. The receiver 1701, the processor 1702, the transmitter 1703, and the memory 1704 communicate with each other using the communications bus 1705.

The receiver 1701 is configured to implement a function of the receiving unit 1401 shown in the FIG. 14. The transmitter 1703 is configured to implement a function of the first sending unit 1404 shown in the FIG. 14. The memory 1704 is configured to store instructions that can be implemented by the identifying unit 1402 and the first obtaining unit 1403 shown in the FIG. 14. The processor 1702 is configured to invoke, from the memory 1704, the instructions that can be implemented by the identifying unit 1402 and the first obtaining unit 1403 shown in the FIG. 14 and execute the instructions.

For specific implementation of the processor 1702, refer to the description of the processor 1602 in the foregoing embodiment. Details are not described herein.

The receiver 1701 is configured to receive an Ethernet frame from a first network apparatus using an Ethernet interface of the second network apparatus, where the Ethernet frame includes a CPRI data identifier.

For specific implementation of the receiver 1701, refer to the description of the receiver 1601 in the foregoing embodiment. Details are not described herein.

The memory 1704 is configured to store program code. The processor 1702 is configured to, after reading the program code stored in the memory 1704, execute the content of determining, according to the CPRI data identifier, that the Ethernet frame carries a segment of a CPRI data stream, and obtaining, a segment of a first CPRI data stream from the Ethernet frame after determining that the Ethernet frame carries the segment of the CPRI data stream.

For specific implementation of the memory 1704, refer to the description of the memory 1604 in the foregoing embodiment. Details are not described herein.

The transmitter 1703 is configured to send the segment of the first CPRI data stream using a CPRI of the second network apparatus.

For specific implementation of the transmitter 1703, refer to the description of the transmitter 1603 in the foregoing embodiment. Details are not described herein.

Optionally, the first CPRI data stream is received by the first network apparatus using a CPRI of the first network apparatus, and the first CPRI data stream is from a first apparatus, and the transmitter 1703 is further configured to send the segment of the first CPRI data stream to a second apparatus using the CPRI of the second network apparatus, where when the first apparatus is an RRU, the second apparatus is a BBU, or when the first apparatus is a BBU, the second apparatus is an RRU.

Optionally, the processor 1702 is further configured to obtain a first value from the Ethernet frame, where the first value is obtained by the first network apparatus according to a frequency of a clock device of the first apparatus and a frequency of a clock device of the first network apparatus, and determine the frequency of the clock device of the first apparatus according to the first value and a frequency of a clock device of the second network apparatus, where the frequency of the clock device of the first network apparatus is equal to the frequency of the clock device of the second network apparatus, and the transmitter 1703 is further configured to send the segment of the first CPRI data stream to the second apparatus using the CPRI of the second network apparatus, where a rate at which the second network apparatus sends the segment of the first CPRI data stream is equal to a product of the frequency of the clock device of the first apparatus and a bit width of the CPRI of the second network apparatus.

Optionally, the processor 1702 is further configured to obtain a first time from the Ethernet frame, where the first time is a time at which the first network apparatus generates the segment of the first CPRI data stream, determine a first latency according to the first time and a third time, where the third time is a time at which the second network apparatus obtains the segment of the first CPRI data stream, and determine a fifth time according to the first latency, and the transmitter 1703 is further configured to send the segment of the first CPRI data stream to the second apparatus at the fifth time using the CPRI of the second network apparatus.

Optionally, the processor 1702 is further configured to obtain a segment of a second CPRI data stream from the Ethernet frame, where the second CPRI data stream is received by the first network apparatus using a CPRI of the first network apparatus, and the second CPRI data stream is from a third apparatus, and the transmitter 1703 is further configured to send the segment of the second CPRI data stream to the second apparatus using a CPRI of the second network apparatus, where when the first apparatus is an RRU, the third apparatus is an RRU, and the first apparatus and the third apparatus are not a same RRU, or when the first apparatus is a BBU, the third apparatus is a BBU, and the first apparatus and the third apparatus are not a same BBU.

Optionally, the processor 1702 is further configured to obtain a second value from the Ethernet frame, where the second value is obtained by the first network apparatus according to a frequency of a clock device of the third apparatus and the frequency of the clock device of the first network apparatus, and determine the frequency of the clock device of the third apparatus according to the second value and the frequency of the clock device of the second network apparatus, where the frequency of the clock device of the first network apparatus is equal to the frequency of the clock device of the second network apparatus, and the transmitter 1703 is further configured to send the segment of the second CPRI data stream to the second apparatus using the CPRI of the second network apparatus, where a rate at which the second network apparatus sends the segment of the second CPRI data stream is equal to a product of the frequency of the clock device of the third apparatus and a bit width of the CPRI of the second network apparatus.

Optionally, the processor 1702 is further configured to obtain a second time from the Ethernet frame, where the second time is a time at which the first network apparatus generates the segment of the second CPRI data stream, determine a second latency according to the second time and a fourth time, where the fourth time is a time at which the second network apparatus obtains the segment of the second CPRI data stream, and determine a sixth time according to the second latency, and the transmitter 1703 is further configured to send the segment of the second CPRI data stream to the second apparatus at the sixth time using the CPRI of the second network apparatus.

Optionally, that the processor 1702 is configured to obtain a segment of a first CPRI data stream and a segment of a second CPRI data stream from the Ethernet frame includes obtaining a first CPRI data segment and a second CPRI data segment from the Ethernet frame, where the Ethernet frame includes a first Ethernet frame, the first Ethernet frame includes the first CPRI data segment, the Ethernet frame includes a second Ethernet frame, and the second Ethernet frame includes the second CPRI data segment, and obtaining the segment of the first CPRI data stream and a first CPRI header from the first CPRI data segment, and obtaining the segment of the second CPRI data stream and a second CPRI header from the second CPRI data segment, where the first CPRI header includes the first value and the first time, and the second CPRI header includes the second value and the second time, or obtaining a first CPRI data segment and a second CPRI data segment from the Ethernet frame, and obtaining the segment of the first CPRI data stream and a first CPRI header from the first CPRI data segment, and obtaining the segment of the second CPRI data stream and a second CPRI header from the second CPRI data segment, where the first CPRI header includes the first value and the first time, and the second CPRI header includes the second value and the second time.

The second network apparatus shown in FIG. 17 is the second network apparatus corresponding to the method for receiving an Ethernet frame shown in FIG. 12. For specific implementation, refer to the description in the method for receiving an Ethernet frame shown in FIG. 12. Details are not described herein.

Figure 18:
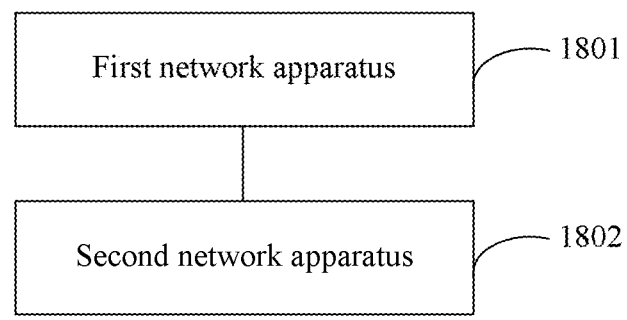
FIG. 18 is a schematic diagram of a hardware structure of a system for transmitting a CPRI data stream according to an embodiment of the present disclosure.

FIG. 18 is a schematic diagram of a hardware structure of a system for transmitting a CPRI data stream according to an embodiment of the present disclosure. The system includes a first network apparatus 1801 for receiving a CPRI data stream shown in FIG. 16, and a second network apparatus 1802 for receiving an Ethernet frame shown in FIG. 17. The first network apparatus 1801 and the second network apparatus 1802 are connected using the Ethernet.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific implementation manners of the present disclosure, but are not intended to limit the protection scope of the present disclosure. Variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a first network apparatus, the method comprising:
   receiving a first common public radio interface (CPRI) data stream through a CPRI of the first network apparatus;
   generating a first Ethernet frame comprising a first CPRI data stream segment associated with the first CPRI data stream and comprising a CPRI data identifier indicating that the first Ethernet frame comprises CPRI data; and
   transmitting the first Ethernet frame to a second network apparatus through a first Ethernet interface of the first network apparatus.

2. The method of claim 1, wherein receiving the first CPRI data stream comprises receiving the first CPRI data stream from a first apparatus, wherein the first Ethernet frame comprises a first value, and wherein the first value is based on a first apparatus clock device frequency and a first network apparatus clock device frequency.

3. The method of claim 2, further comprising receiving, through the CPRI, a second CPRI data stream from a second apparatus, and wherein the first Ethernet frame further comprises a second CPRI data stream segment associated with the second CPRI data stream.

4. The method of claim 3, wherein the first Ethernet frame further comprises a second value associated with a second apparatus clock device frequency and the first network apparatus clock device frequency.

5. The method of claim 4, wherein the first Ethernet frame further comprises a first time at which the first network apparatus generates the first CPRI data stream segment.

6. The method of claim 5, wherein the first Ethernet frame further comprises a second time at which the first network apparatus generates the second CPRI data stream segment.

7. The method of claim 6, further comprising:
   generating a first CPRI data segment and a second CPRI data segment, wherein the first CPRI data segment comprises the first CPRI data stream segment and a first CPRI header, wherein the first CPRI header comprises the first value and the first time, wherein the second CPRI data segment comprises the second CPRI data stream segment and a second CPRI header, and wherein the second CPRI header comprises the second value and the second time; and
   generating a second Ethernet frame and a third Ethernet frame,
   wherein the second Ethernet frame comprises the first CPRI data segment,
   wherein the third Ethernet frame comprises the second CPRI data segment, and
   wherein the first Ethernet frame comprises the second Ethernet frame and the third Ethernet frame.

8. The method of claim 6, further comprising generating a first CPRI data segment and a second CPRI data segment, wherein the first CPRI data segment comprises the first CPRI data stream segment and a first CPRI header, wherein the first CPRI header comprises the first value and the first time, wherein the second CPRI data segment comprises the second CPRI data stream segment and a second CPRI header, wherein the second CPRI header comprises the second value and the second time, and wherein generating the first Ethernet frame comprises generating the first Ethernet frame comprising the first CPRI data segment and the second CPRI data segment.

9. A method implemented by a second network apparatus, the method comprising:
   receiving a first Ethernet frame from a first network apparatus through an Ethernet interface of the second network apparatus, wherein the first Ethernet frame comprises a common public radio interface (CPRI) data identifier and a first CPRI data stream segment;
   obtaining the first CPRI data stream segment from the first Ethernet frame; and
   transmitting the first CPRI data stream segment to a second apparatus through a second network apparatus CPRI.

10. The method of claim 9, further comprising:
    obtaining a first value from the first Ethernet frame according to a first apparatus clock device frequency and a first network apparatus clock device frequency; and
    determining the first apparatus clock device frequency according to the first value and a second network apparatus clock device frequency,
    wherein the first network apparatus clock device frequency is equal to the second network apparatus clock device frequency, and
    wherein transmitting the first CPRI data stream segment comprises transmitting the first CPRI data stream segment at a rate that is equal to a product of the first apparatus clock device frequency and a second network apparatus CPRI bit width.

11. The method of claim 10, wherein transmitting the first CPRI data stream segment comprises transmitting the first CPRI data stream segment to the second apparatus at a first time through the CPRI, wherein the first time is associated with a second time at which the second network apparatus obtains the first CPRI data stream segment and a third time at which the first network apparatus generates the first CPRI data stream segment.

12. The method of claim 11, further comprising:
obtaining a second CPRI data stream segment from the first Ethernet frame; and
sending the second CPRI data stream segment to the second apparatus through the second network apparatus CPRI.

13. The method of claim 12, wherein obtaining the first CPRI data stream segment and the second CPRI data stream segment from the first Ethernet frame comprises either:
obtaining a first CPRI data segment and a second CPRI data segment from the first Ethernet frame, wherein the first Ethernet frame comprises a second Ethernet frame and a third Ethernet frame, wherein the second Ethernet frame comprises the first CPRI data segment, and wherein the third Ethernet frame comprises the second CPRI data segment, obtaining the first CPRI data stream segment and a first CPRI header from the first CPRI data segment, and obtaining the second CPRI data stream segment and a second CPRI header from the second CPRI data segment, wherein the first CPRI header comprises the first value and the first time, and wherein the second CPRI header comprises a second value and a fourth second time; or
obtaining the first CPRI data stream segment and the first CPRI header from the first CPRI data segment, and obtaining the second CPRI data stream segment and the second CPRI header from the second CPRI data segment, wherein the first CPRI header comprises the first value and the first time, and wherein the second CPRI header comprises the second value and the fourth time.

14. A first network apparatus comprising:
a receiver configured to receive a first common public radio interface (CPRI) data stream through a first network apparatus CPRI;
a processor coupled to the receiver and configured to generate an Ethernet frame, wherein the Ethernet frame comprises a first CPRI data stream segment associated with the first CPRI data stream and comprises a CPRI data identifier indicating that the Ethernet frame comprises CPRI data; and
a transmitter coupled to the receiver and the processor and configured to send the Ethernet frame to a second network apparatus through an Ethernet interface of the first network apparatus.

15. The first network apparatus of claim 14, wherein the Ethernet frame further comprises a first value, wherein the first value is associated with a first apparatus clock device frequency and a first network apparatus clock device frequency, and wherein the first CPRI data stream is received from a first apparatus.

16. The first network apparatus of claim 15, wherein the receiver is further configured to receive, through the first network apparatus CPRI, a second CPRI data stream from a second apparatus, wherein the processor is further configured to generate a second CPRI data stream segment according to the second CPRI data stream, and wherein the Ethernet frame further comprises the second CPRI data stream segment.

17. A second network apparatus comprising:
a receiver configured to receive an Ethernet frame from a first network apparatus through a second network apparatus Ethernet interface, wherein the Ethernet frame comprises a common public radio interface (CPRI) data identifier and a CPRI data stream segment;
a processor coupled to the receiver and configured to obtain a first CPRI data stream segment from the Ethernet frame; and
a transmitter coupled to the receiver and the processor and configured to send, through a second network apparatus CPRI, the first CPRI data stream segment to a second apparatus.

18. The second network apparatus of claim 17, wherein the processor is further configured to determine a first apparatus clock device frequency according to a first value and a second network apparatus clock device frequency, wherein the transmitter is further configured to send the first CPRI data stream segment to a first apparatus using the second network apparatus CPRI, and wherein a rate at which the transmitter sends the first CPRI data stream segment is equal to a product of the first apparatus clock device frequency and a bit width of the second network apparatus CPRI.

19. The second network apparatus of claim 18, wherein the processor is further configured to obtain, from the Ethernet frame, a first time at which the first network apparatus generates the first CPRI data stream segment, and wherein the transmitter is further configured to send, through the second network apparatus CPRI, the first CPRI data stream segment to the first apparatus at a second time associated with the first time.

20. The second network apparatus of claim 19, wherein the processor is further configured to obtain a second CPRI data stream segment from the Ethernet frame, and wherein the transmitter is further configured to send the second CPRI data stream segment to the first apparatus using the second network apparatus CPRI.

* * * * *